United States Patent
Ueno

(10) Patent No.: US 7,876,675 B2
(45) Date of Patent: Jan. 25, 2011

(54) MULTICAST NETWORK MONITORING METHOD AND MULTICAST NETWORK SYSTEM TO WHICH THE METHOD IS APPLIED

(75) Inventor: Hitoshi Ueno, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 624 days.

(21) Appl. No.: 11/585,275

(22) Filed: Oct. 24, 2006

(65) Prior Publication Data
US 2008/0002591 A1    Jan. 3, 2008

(30) Foreign Application Priority Data
Jun. 29, 2006   (JP) ............................. 2006-180031

(51) Int. Cl.
*G01R 31/08* (2006.01)
*H04L 12/28* (2006.01)
*G06F 15/173* (2006.01)

(52) U.S. Cl. ..................... 370/229; 370/235; 370/236; 370/389; 709/223; 709/224

(58) Field of Classification Search ................ 370/229, 370/235, 236; 709/223, 224
See application file for complete search history.

(56) References Cited

U.S. PATENT DOCUMENTS 4,617,663 A * 10/1986 Lake et al. .................. 714/736
2002/0161884 A1 * 10/2002 Munger et al. ............... 709/224
2003/0041146 A1 * 2/2003 Davis et al. .................. 709/227
2006/0041660 A1 * 2/2006 Bishop et al. ................ 709/224

FOREIGN PATENT DOCUMENTS

JP      11-110365       4/1999

* cited by examiner

*Primary Examiner*—Huy D Vu
*Assistant Examiner*—Brandon Renner
(74) *Attorney, Agent, or Firm*—Staas & Halsey LLP

(57) ABSTRACT

Disclosed is a multicast network system including a multicast network which provides a plurality of relay nodes, and a monitoring server and a plurality of acknowledgment agents connected to the multicast network. The monitoring server includes an acknowledgment request message generating and sending unit that generates and sends an acknowledgment request message storing an acknowledgment probability to the plurality of acknowledgment agents; a collecting unit that collects acknowledgment messages from acknowledgment agents; and a collection number comparing unit that compares the number of acknowledgment messages collected by the acknowledgment message collecting unit with the expected number of acknowledgment messages obtained from the acknowledgment probability and the total number of acknowledgment agents. The acknowledgment agent has an acknowledgment message sending unit that determines whether an acknowledgment is needed for the acknowledgment request message based on the acknowledgment probability stored in the acknowledgment request message to send an acknowledgment message.

21 Claims, 11 Drawing Sheets

MULTICAST NETWORK MONITORING METHOD AND MULTICAST NETWORK SYSTEM TO WHICH THE METHOD IS APPLIED

CROSS-REFERENCE TO RELATED APPLICATIONS

This application is based upon and claims the benefit of priority from the prior Japanese Patent Application No. 2006-180031, filed on Jun. 29, 2006, the entire contents of which are incorporated herein by reference.

BACKGROUND OF THE INVENTION

1. Field of the Invention

The present invention relates to a multicast network monitoring method and a multicast network system to which the same is applied.

2. Description of the Related Art

A multicast network means a network that performs a so-called push type operation of copying and distributing a packet to other terminals in the same group when one terminal in a group including a plurality of terminals transmits the packet to the network.

FIG. 1 shows a configuration example of a multicast network system with a multicast network function, which is used for providing services such as IPTV or remote lectures. In FIG. 1, a multicast network 1 includes a plurality of relay routers RT.

When one packet is input to the relay router RT of the multicast network 1, the packet is copied and output to each user terminal STU. Therefore, content from a distribution server 2 for content, etc., can be distributed to a plurality of the user terminals STU at the same time. To realize such a multicast network, two protocols operate.

One protocol is a membership management protocol used when a terminal notifies the network of participation in a group and the other protocol is a multicast routing protocol for determining a distribution path of a packet in the network. The former membership management protocol is represented by IGMP (Internet Group Multicast Protocol) [RFC1112] (Note 1), [RFC2236] (Note 2), and the MLD (Multicast Listener Discovery) [RFC2710] (Note 3). The IGMP is used in the IPv4 network and the MLD is used in the IPv6 network.

With regard to the operation, the protocol is used when a terminal notifies an edge router of participation in a group. Specifically, the terminal notifies the edge router of participation in a multicast address (=group address) of class D. When a packet sent to the specified group address arrives, the edge router copies and transmits the packet to the terminal that has sent the notification (accurately, an interface connected with the terminal).

As a general rule, one terminal can belong to a plurality of groups.

The latter multicast routing protocol is a protocol used when a terminal notifies the edge router of participation in a group and the traffic to the corresponding group address does not arrive. The protocol is represented by PIM-SM (Protocol Independent Multicast-Sparse Mode) [RFC2362] (Note 4), and PIM-SSM (PIM-Source Specific Multicast) [RFC3569] (Note 5).

With regard to the operation, the edge router notifies an upstream next-hop router in a shortest path to a predefined router (representative router or transmission source router) of a request for participation in the group to request transfer of the traffic to the relevant group. If the traffic does not arrive in the upstream router, this operation is repeatedly performed until reaching an upstream router that can distribute the traffic.

(Note 1) [RFC1112] "Internet Group Multicast Protocol (IGMP)", IETF, RFC1112

(Note 2) [RFC2236] "Internet Group Multicast Protocol, Version 2", IETF, RFC2236

(Note 3) [RFC2362] "Protocol Independent Multicast-Sparse Mode (PIM-SM)", IETF, RFC2262

(Note 4) [RFC2716] "Multicast Listener Discovery (MLD) for IPv6", IETF, RFC2716

(Note 5) [RFC3569] "An Overview of Source-Specific Multicast (SSM)", IETF, RFC3569

In such a multicast network system, since importance is attached to a real time property of the simultaneous distribution in the function of the distribution server 2, the transmission is performed using RTP (Real-Time Transport protocol)/UDP (User Datagram protocol), which uses no transmission confirmation.

Therefore, if a failure occurs in the multicast network 1, a sender, especially, a content provider cannot know the occurrence of the failure. Therefore, a distribution monitoring server 3 is disposed to monitor the network.

Several conventional arts are applied to such network monitoring of the monitoring server 3. The network monitoring will be described as follows.

(1) Communication Monitoring with ICMP (Internet Control Message Protocol) Ping Mode for Each User Terminal STU The ping mode is a mode when the monitoring server 3 sends the ICMP Ping to each terminal STU and receives responses to check connectivity of the network 1.

The monitoring server 3 sends the ping to each terminal STU in order. Therefore, if a large number of terminals exist, intervals of sending the ping to one terminal are increased due to a server load, and it is problematic that detection of a failure is delayed.

Since the ICMP Ping is not distributed with the multicast mechanism (e.g., the ping may arrive at the terminal STU via a different path), it is problematic that the ICMP Ping is essentially inadequate for the communication monitoring of the multicast network 1.

(2) Multicast-Base Communication Monitoring i. ACK Mode: The monitoring server 3 multicasts acknowledgment request packets to the terminals STU and checks presence of an acknowledgment from each terminal STU to detect occurrence of abnormality.

In this mode, as the number of the terminals STU increases, more packets arrive at the monitoring server 3 and, eventually, the monitoring server 3 will not be able to process the packets (this is referred to as ACK Implosion, which is a well-known behavior).

ii. ACK Aggregation Mode: FIG. 2 is a diagram describing an ACK aggregation mode and, as shown in FIG. 2, a plurality of ACK aggregation servers is disposed in a network (In the example of FIG. 2, terminals STU1, STU2, STU3 carry out an aggregation function). Instead of directly returning ACKs to the monitoring server 3, the terminals notify the aggregation servers STU1, STU2, STU3 of the ACKs. By checking the ACKs at the servers, the implosion can be prevented in the number of the acknowledgment packets to the monitoring server 3 in the case of the above ACK mode.

However, in this ACK aggregation mode, if the terminals increase, more aggregation servers are needed, and it is problematic that implosion occurs in time-out notifications from aggregation servers. If a plurality of stages is formed by the aggregation servers to avoid the implosion of the time-out notifications, the time-out must be waited at each stage and it takes time to detect a failure.

A known background art includes a technology of performing multicast communication that a first computer transmits a request message to a second computer to receive acknowledgment messages in a network computer system with a plurality of computers connected through a network (Japanese Patent Application Laid-Open Publication No. 1999-110365). Although recovery from a failure of a computer is shown in Japanese Patent Application Laid-Open Publication No. 1999-110365, detection of a failure in the network is not mentioned.

Although a plurality of monitoring modes are proposed as described above, it is difficult in any case to detect network communication disconnection that may affect a multiplicity of users in a large-scale multicast network.

SUMMARY OF THE INVENTION

It is therefore the object of the present invention to provide a network monitoring method that can quickly detect network communication disconnection to solve such a problem, and a multicast network to which the same is applied.

In order to achieve the above object, according to a major aspect of the present invention there is provided a multicast network system comprising a multicast network including a plurality of relay nodes, and a monitoring server and a plurality of acknowledgment agents connected to the multicast network, the monitoring server comprising an acknowledgment request message generating and sending unit that generates and sends an acknowledgment request message storing an acknowledgment probability to the plurality of acknowledgment agents; a collecting unit that collects acknowledgment messages from the acknowledgment agents; and a collection number comparing unit that compares the number of the acknowledgment messages collected by the acknowledgment message collecting unit with the expected number of the acknowledgment messages obtained from the acknowledgment probability and the total number of the acknowledgment agents, the acknowledgment agent comprising an acknowledgment message sending unit that determines whether an acknowledgment is needed for the acknowledgment request message based on the acknowledgment probability stored in the acknowledgment request message to send an acknowledgment message, the collection number comparing unit of the monitoring server determining whether a failure occurs in the multicast network based on a comparison result of the expected number of the acknowledgment messages and the number of the acknowledgment messages actually collected by the acknowledgment message collecting unit.

Preferably, in the multicast network system of the present invention, the acknowledgment request message generating and sending unit further stores into the acknowledgment request message an acknowledgment area identifier that identifies an acknowledgment area; and the acknowledgment agent compares the acknowledgment area identifier stored in the acknowledgment request message with an identifier of an area to which the own acknowledgment agent belongs and, if the identifiers are identical, the acknowledgment message sending unit determines whether an acknowledgment is needed for the acknowledgment request message based on the acknowledgment probability stored in the acknowledgment request message to send an acknowledgment message.

Preferably, in the multicast network system of the present invention, the acknowledgment request message generating and sending unit further stores an order identification number into the acknowledgment request message; when generating and sending an acknowledgment message, the acknowledgment agent copies the order identification number stored in the acknowledgment request message to store the number into the acknowledgment message, which is transmitted; and If a received acknowledgment message stores the order identification number earlier in the order than the order identification number stored in acknowledgment messages already received, the acknowledgment message is not counted by the collection number comparing unit of the monitoring server.

Preferably, in the multicast network system of the present invention, the monitoring server includes a group acknowledgment area identifier retaining unit that stores a plurality of groups, each of which includes a plurality of the acknowledgment area identifiers; and the acknowledgment request message generating and sending unit stores into the acknowledgment request message the acknowledgment area identifiers belonging to the group read from the group acknowledgment area identifier retaining unit to send the acknowledgment request message for each group.

Preferably, in the multicast network system of the present invention, the collection number comparing unit of the monitoring server collects the acknowledgment messages from the acknowledgment agents for each group acknowledgment area and specifies an acknowledgment area with the smallest number of the acknowledgment messages to perform a failure determination process if the number of the acknowledgment messages actually collected is smaller by a predetermined value or more than the expected number of the acknowledgment messages calculated from the acknowledgment probability and the number of the acknowledgment agents belonging to the group acknowledgment area.

Preferably, in the multicast network system of the present invention, a comparison item of the collection number comparing unit is specified by a predefined reduction rate relative to the expected number of acknowledgments.

Preferably, in the multicast network system of the present invention, a comparison item of the collection number comparing unit is specified by a predefined statistical significance level.

Preferably, in the multicast network system of the present invention, the monitoring server includes a unit that stores the selected number of suspect areas and, if the number of the acknowledgment messages actually collected is smaller by a predetermined value or more than the expected number of the acknowledgment messages calculated from the acknowledgment probability and the number of the acknowledgment agents, the monitoring server selects areas with the smallest numbers of the acknowledgment messages to the selected number of suspect areas registered in advance and designates the selected areas as the acknowledgment areas to perform the failure determination process.

Preferably, in the multicast network system of the present invention, the selected number of suspected areas registered in advance is the number of messages at the time of a narrowing down process defined in advance.

Preferably, in the multicast network system of the present invention, the monitoring server includes a unit that defines an acknowledgment probability in the case of narrowing down the area to perform a monitoring process.

Preferably, in the multicast network system of the present invention, the monitoring server includes a unit that stores a statistical significance level for comparison in the case of narrowing down the area to perform a monitoring process and the comparison item of the collection number comparing unit is a statistical significance level at the time of a narrowing down process defined in advance by an administrator, etc.

Preferably, the multicast network system of the present invention further comprises a unit that defines an acknowledgment probability in the case of narrowing down the area to perform a monitoring process and a unit that stores a statistical significance level for comparison in the case of narrowing down the area to perform a monitoring process.

Preferably, the multicast network system of the present invention further comprises a representative agent specified for the plurality of acknowledgment agents, the representative agent including a list of acknowledgment agents, wherein when the acknowledgment request message is received, the acknowledgment message is transmitted in accordance with the acknowledgment probability in the acknowledgment request message, wherein the acknowledgment message of the representative agent is transmitted every time the acknowledgment request message is received, wherein when the acknowledgment message is received, the representative agent registers the reception in the list, and wherein an alarm is sent at predetermined intervals if the acknowledgment messages are received from only a portion of the acknowledgment in the list.

By determining a failure with the features of the present invention based on the number of acknowledgments from the acknowledgment agents in the multicast network, if a large-scale failure occurs, the failure can be detected quickly. By narrowing down the area and performing the acknowledgment request process again, candidates for the failure point can be extracted more accurately, and an operation such as failure recovery can be started quickly.

BRIEF DESCRIPTION OF THE DRAWINGS

The above and other objects, aspects, features and advantages of the present invention will become more apparent from the following detailed description when taken in conjunction with the accompanying drawings, in which.

DETAILED DESCRIPTION OF THE PREFERRED EMBODIMENTS

Description will hereinafter be made of embodiments of the present invention with reference to the drawings. The embodiments are for the purpose of understanding the present invention and do not limit the technical scope of the present invention.

Figure 1:
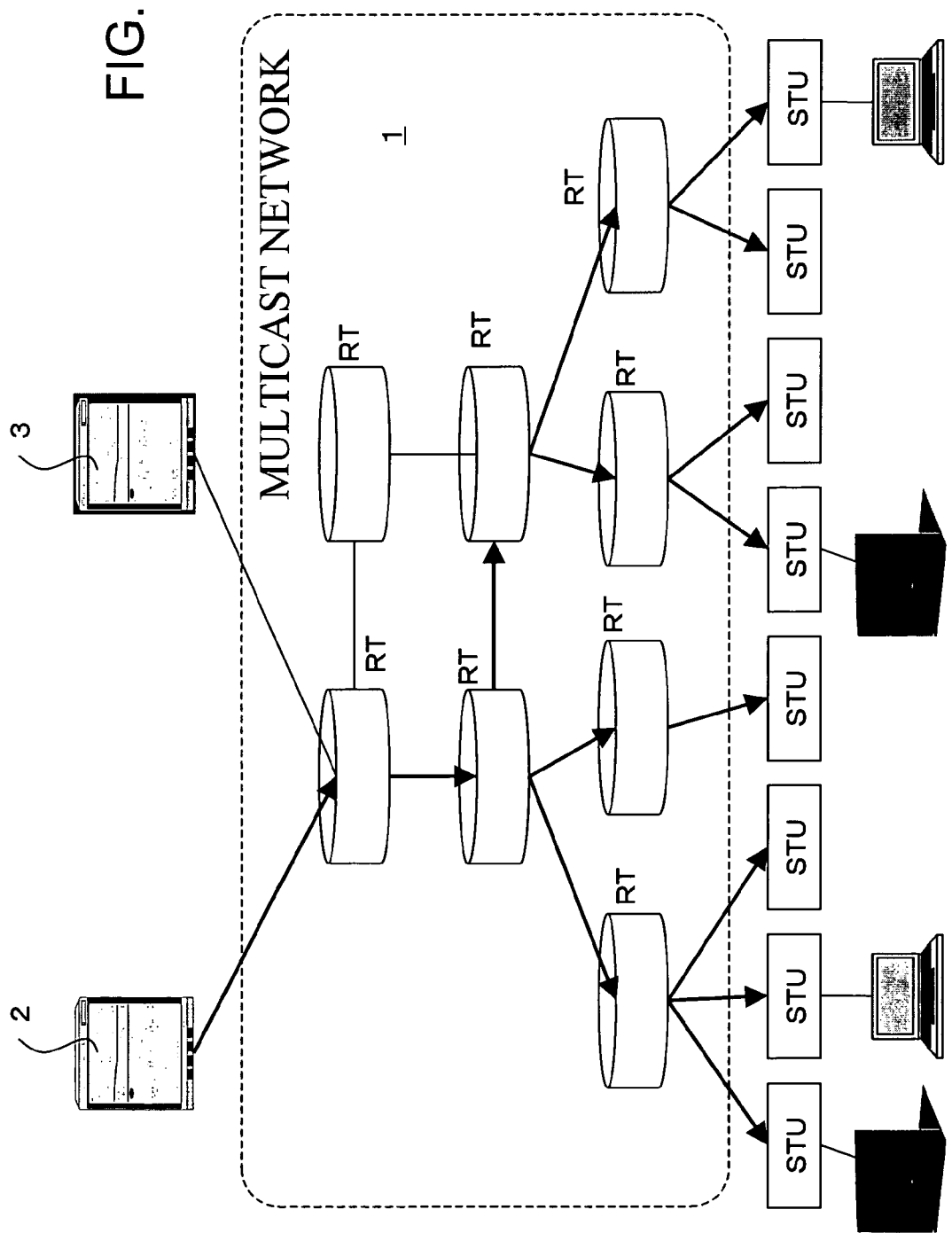
FIG. 1 shows a configuration example of a multicast network system with a multicast network function.
Figure 2:
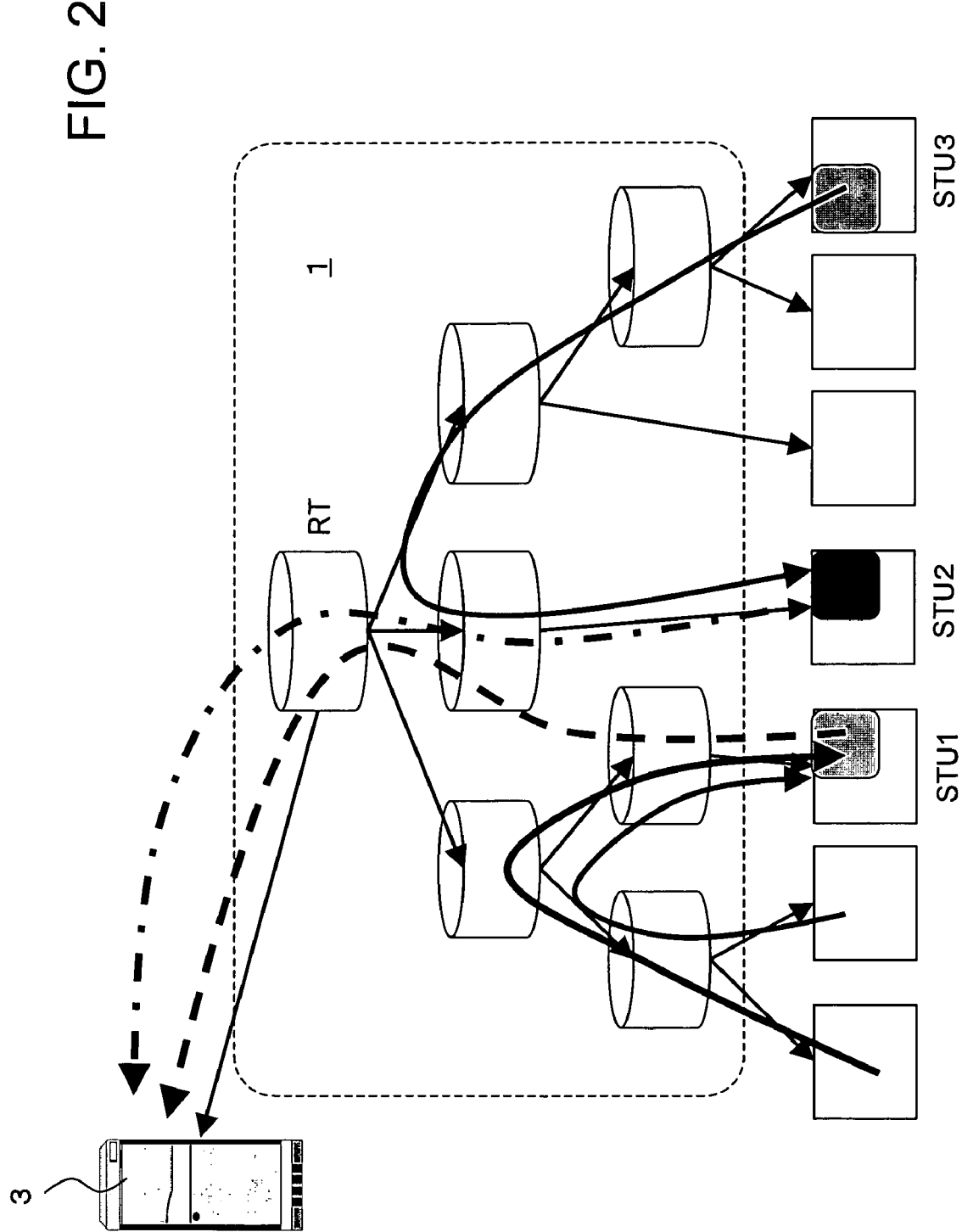
FIG. 2 is a diagram describing an ACK aggregation mode.
Figure 3:
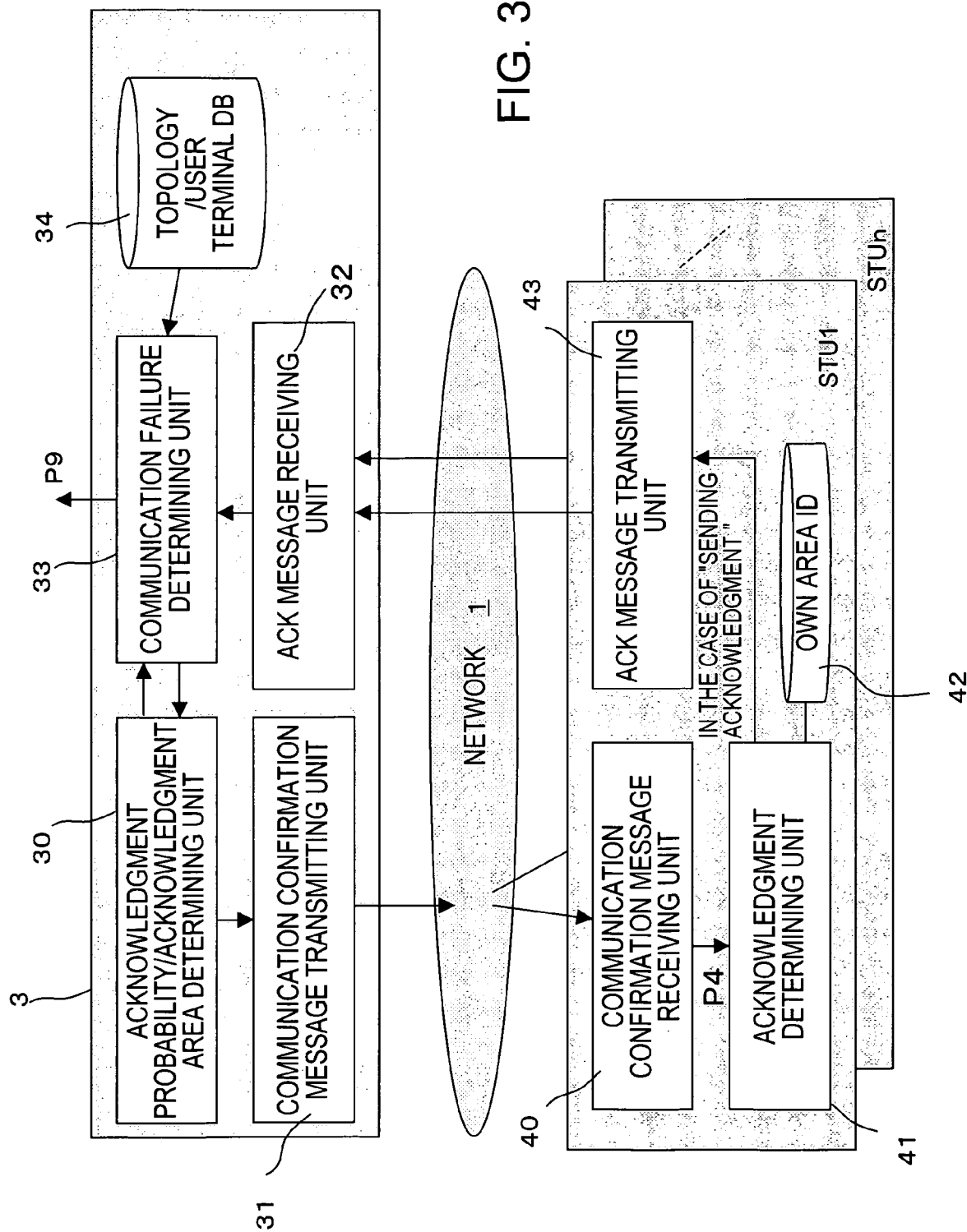
FIG. 3 shows a multicast network system according to the present invention.

FIG. 3 shows a multicast network system according to the present invention. Particularly, FIG. 3 shows a block diagram of a configuration example of a monitoring server 3 and a user terminal STU connected to a multicast network 1 with a plurality of relay nodes (not shown) to which the present invention is applied.

In the description of the present invention, the user terminal STU is not limited to a computer terminal directly operated by a user and is used as a generic name of in-home apparatuses or devices such as set boxes.

If the user terminal STU incorporates a control program (acknowledgment agent) responding to an acknowledgment request message sent from the monitoring server 3 to support the present invention, the user terminal STU is equivalently referred to the acknowledgment agent, or simply the agent, in the following description.

First Embodiment

Figure 4:
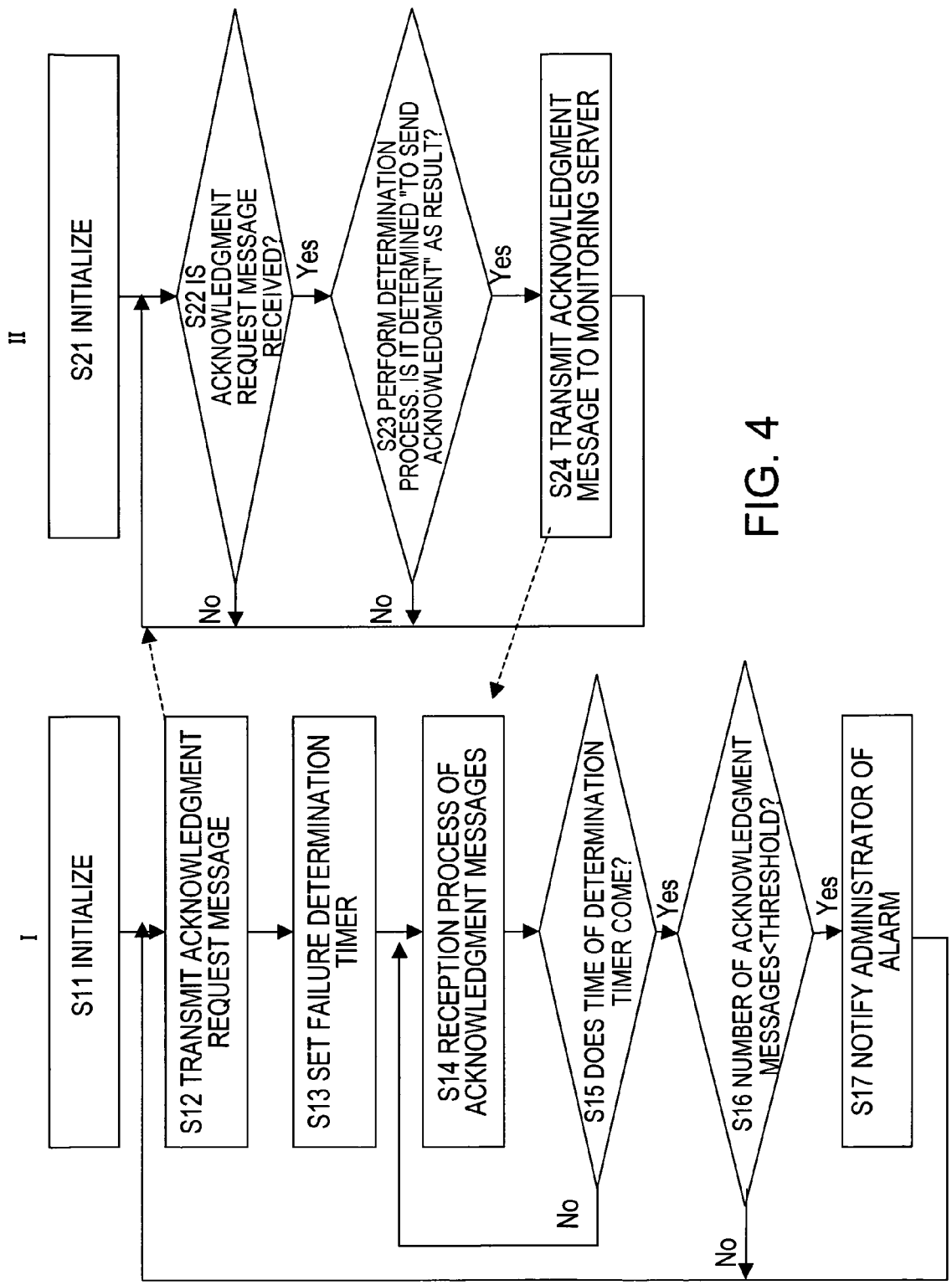
FIG. 4 is an operation flow of a first embodiment of the present invention corresponding to FIG. 3.

FIG. 4 is an operation flow of a first embodiment of the present invention corresponding to FIG. 3. Description will be made of an operation example of the multicast network system with reference to FIG. 4.

In FIG. 4, I is an operation flow portion for the monitoring server 3 and II is an operation flow portion for the acknowledgment agent.

[Monitoring Server's Process I]

In the monitoring server 3, an acknowledgment probability/acknowledgment area determining unit 30 accepts an activation request from a system administrator along with arguments, which are an acknowledgment probability, the number of agents, the number of acknowledgment messages used as a determination threshold, a transmission/determination interval, and a monitoring group address (step S11).

For example, it is assumed that the arguments of the activation request are the acknowledgment probability of 5%, the number of agents of 10,000, the determination threshold x (=450) for the expected number of acknowledgment messages of 500 (=10,000×5%), the transmission/determination interval of one second, and the monitoring group address of (224.0.0.2).

The arguments may be read from a configuration file, etc., in a database 34 after activation.

A communication confirmation message transmitting unit 31 stores the arguments into an IP packet and sends out an acknowledgment request message to a multicast network 1 (step S12).

Figure 5:
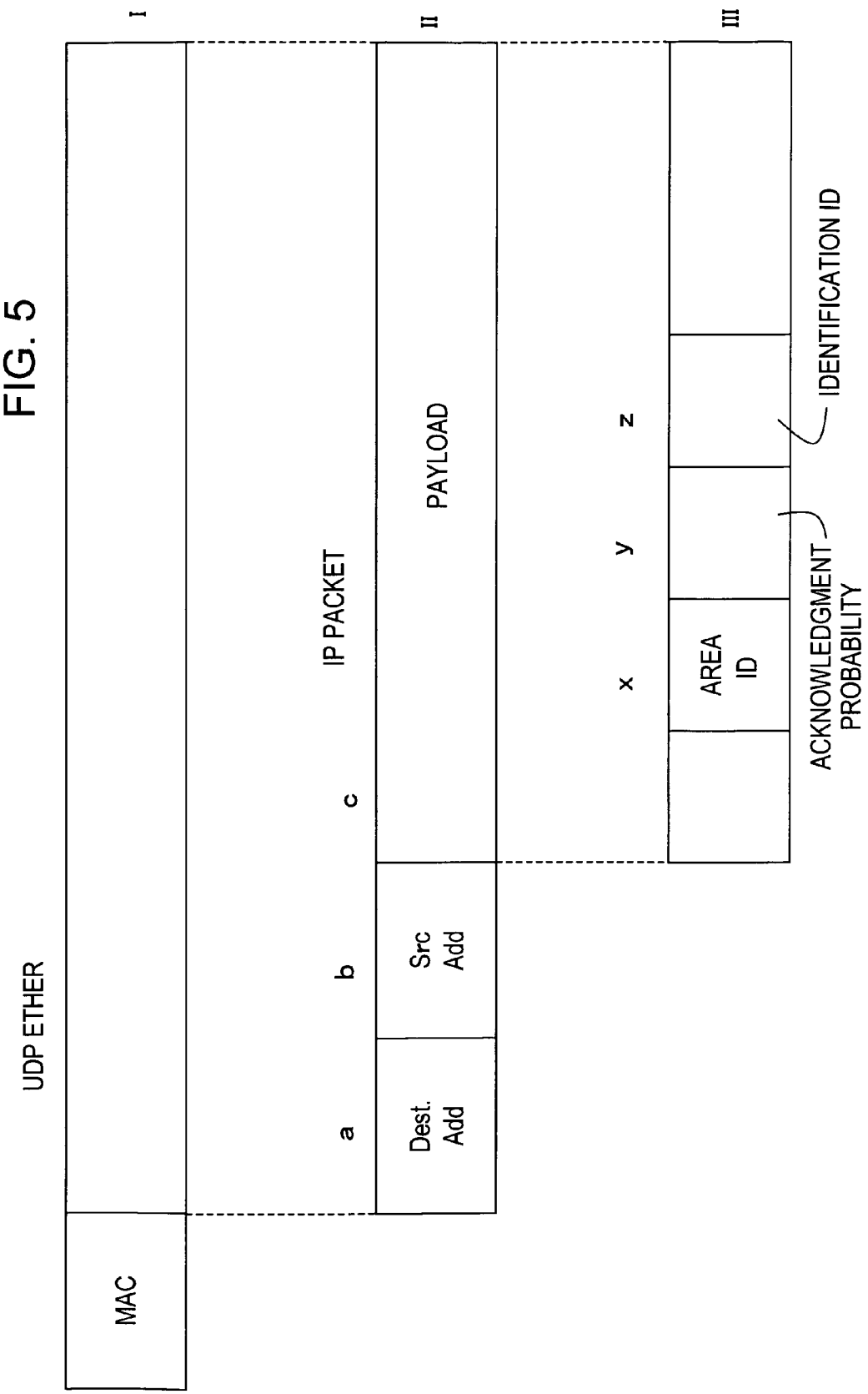
FIG. 5 is a diagram describing a packet sent out from a communication confirmation message transmitting unit.

Description will be made of the packet sent out from the communication confirmation message transmitting unit 31 with reference to FIG. 5. In FIG. 5, an IP packet II includes a destination address field a storing a destination address and a source address field b storing a source address in a header portion.

As shown in III of FIG. 5, a payload field c of the IP packet II includes an area identifier x, an acknowledgment probability y, and an acknowledgment agent identifier z.

Figure 6:
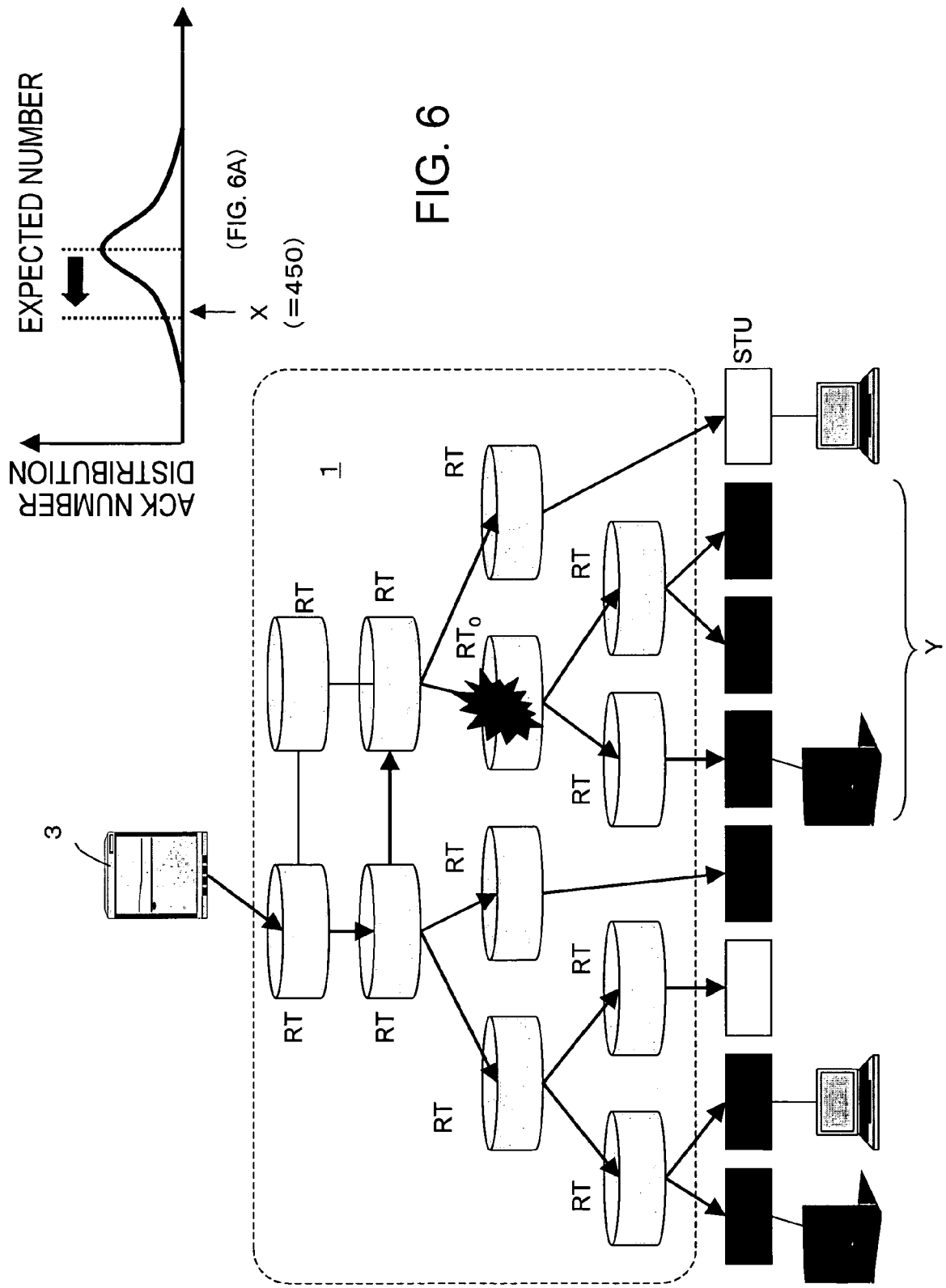
FIG. 6 is a diagram describing packet transfer of a plurality of relay nodes RT in a multicast network 1.

When the IP packet II is sent out to the multicast network 1, as shown in FIG. 6, each of a plurality of relay nodes RT in the multicast network 1 copies and transmits the IP packet II after adding a MAC address of a subordinate relay node (I of FIG. 5). As a result, a communication confirmation message can reach acknowledgment agents STU1 to STUn, which are a plurality of user terminals connected to the multicast network 1.

Referring again to FIG. 4 for description, based on the arguments set by the system administrator, the communication confirmation message transmitting unit 31 stores the monitoring group address (224.0.0.2) into the destination address field a and the address of the monitoring server 3 into the source address field b in the header portion of the IP packet II.

The acknowledgment probability y of 5% is stored into the payload field c of the IP packet. The IP packet with such a configuration is sent out to the multicast network.

The monitoring group address (224.0.0.2) is a common address defined for agents that indicate the intention to participate in the multicast network.

The monitoring server 3 sets and activates a determination timer not shown for an acknowledgment (ACK) message receiving unit 32 such that the timer is activated after one second, which is the determination time acquired as described above (step S13).

The acknowledgment (ACK) message receiving unit 32 receives acknowledgment messages from the acknowledgment agents in a unicast manner and counts up the number of the acknowledgment messages (step S14).

When the setting time of the determination timer comes (Yes at step S15), the communication failure determining unit 33 compares the total number of the acknowledgment messages with the determination threshold X (=450) for the expected number of the acknowledgment messages set by the system administrator (step S16).

In this comparison process in the communication failure determining unit 33, as shown in (FIG. 6A), if the number of the acknowledgment messages is smaller than the determination threshold (=450) for the expected number (No at step S16), for example, if the number of the acknowledgment messages is 440, the system administrator is notified of an alarm (step S17). Otherwise, the procedure goes back to step S12, and the acknowledgment request message is transmitted again after a predetermined time period.

[Acknowledgment Agent's (User Terminal's) Process II]

On the other hand, after activation, the acknowledgment agent STU acquires an acknowledgment agent identifier ID, which is stored in a memory 42 as an own area identifier, and waits for the acknowledgment request message from the monitoring server 3 (step S21).

The acknowledgment agent identifier ID may be in a format such as "KANTO.KANAGAWA.KAWASKI.1234", for example, and includes a combination of a regional area and a unique identification number. This may be set by the system administrator, etc., or a mechanism may be included for an inquiry to the monitoring server 3.

A communication confirmation message receiving unit 40 of the acknowledgment agent STU checks the received packet for the common monitoring group address (224.0.0.2) in the multicast network to which the own agent belongs to receive the acknowledgment request message (Yes at step S22).

The acknowledgment probability (y in III of FIG. 5) is acquired which is stored in the received packet that is the acknowledgment request message. In the example described above, the acknowledgment probability is 5% and is set by the system administrator.

In the acknowledgment agent, an acknowledgment determining unit 41 performs a process to determine whether the acknowledgment message is returned with a probability of 5%. For example, this process can be realized by generating a random number with the use of a random number generating unit typically included as a library in a computer to generate uniformly distributed random numbers from 0 to 1, and by determining "to send an acknowledgment" if the result is in a range of 0 to 0.05 and determining "not to send an acknowledgment" if the result is not in that range.

If it is determined "to send an acknowledgment" to the acknowledgment request message (Yes at step S23), an acknowledgment message transmitting unit 43 copies the source address in the acknowledgment request message, generates an acknowledgment message storing the acknowledgment agent identifier, and returns the acknowledgment to the monitoring server 3 (step S24).

Therefore, the returned message is received by the ACK message receiving unit 32 of the monitoring server 3 through the aforementioned process of the monitoring server 3 after step S14 and it is determined whether a failure exists. On the other hand, in FIG. 6, since acknowledgments are not generated by the agents in a range of Y due to a failure of the relay router RTo, the number of generation of the acknowledgment messages is decreased.

Description will be made of other embodiments modified in various ways from the basic configuration described above.

Second Embodiment

A second embodiment is most appropriate when a system administrator, etc., want to know a situation/abnormality in a certain area. The determination accuracy can be improved by narrowing down a certain area.

Figure 7:
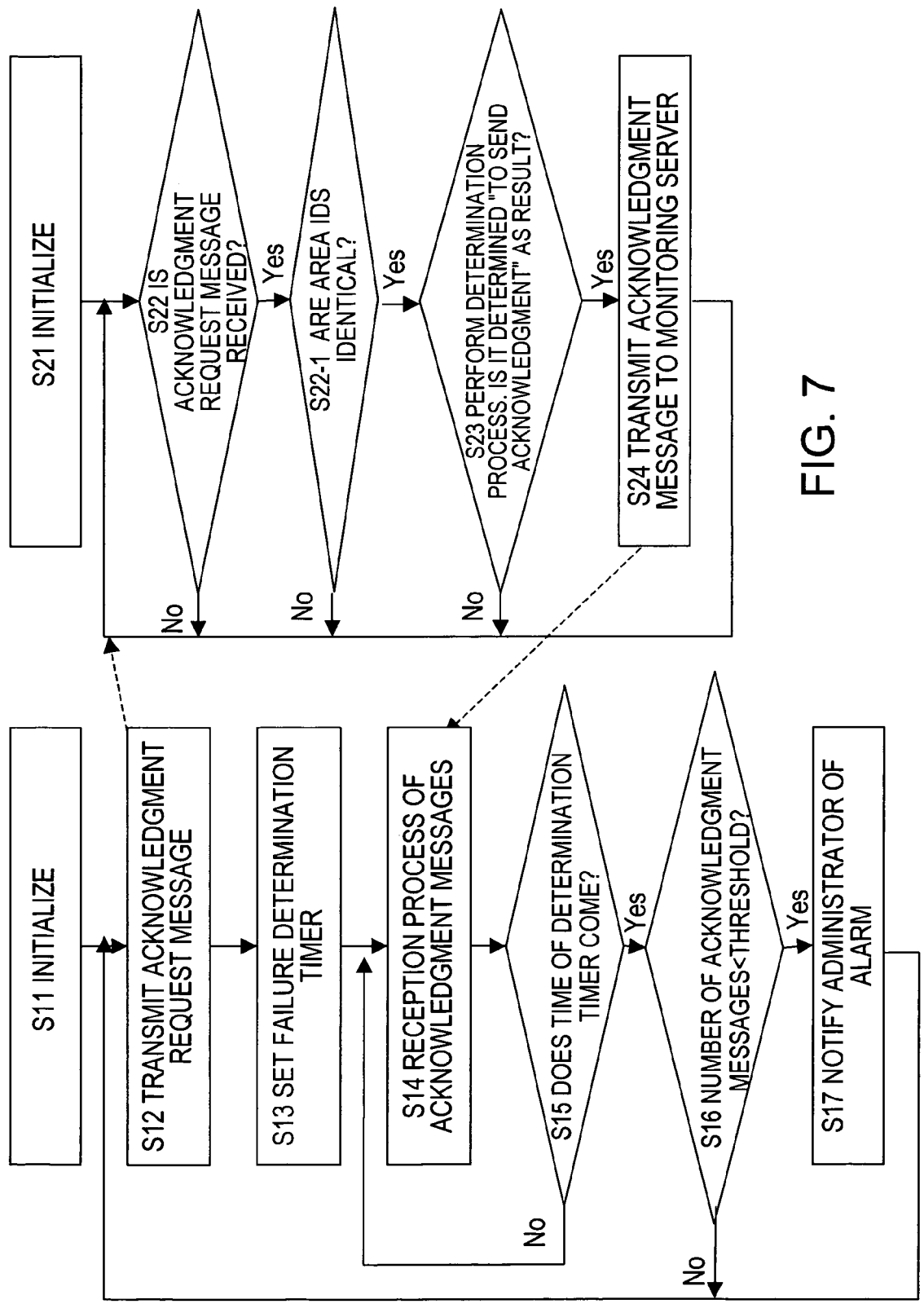
FIG. 7 is an operation flow of a second embodiment.

FIG. 7 is an operation flow of the second embodiment and the operation of the embodiment will be described with reference to FIG. 7.

[Monitoring Server's Process I]

In the monitoring server 3, the acknowledgment probability/acknowledgment area determining unit 30 accepts an activation request from the system administrator along with arguments, which are an acknowledgment probability, an acknowledgment area identifier, the number of agents in the acknowledgment area, the number of acknowledgment messages used as a determination threshold, a transmission/determination interval, and a monitoring group address (step S11).

For example, it is assumed that the arguments of the activation request are the acknowledgment probability of 5%, the number of agents in the acknowledgment area of 5,000, the number of messages used as a determination threshold (=230), the transmission/determination interval of one second, the monitoring group address of (224.0.0.2), and the acknowledgment area identifier of "KANTO KANAGAWA".

The arguments may be read from a configuration file, etc., in the database 34 after activation.

The communication confirmation message transmitting unit 31 stores the arguments into an IP packet and sends out an acknowledgment request message to the multicast network 1 (step S12).

Based on the arguments set by the system administrator, the communication confirmation message transmitting unit 31 stores the monitoring group address (224.0.0.2) into the destination address field a and the address of the monitoring server 3 into the source address field b in the header portion of the IP packet II.

The acknowledgment probability y of 5% and the acknowledgment area identifier "KANTO KANAGAWA" are stored into the payload field c of the IP packet. The IP packet with such a configuration is sent out to the multicast network.

The monitoring server 3 sets and activates a determination timer not shown for the acknowledgment (ACK) message receiving unit 32 such that the timer is activated after one second, which is the determination time acquired as described above (step S13).

The acknowledgment (ACK) message receiving unit 32 receives the acknowledgment messages from the acknowledgment agents in a unicast manner and counts up the number of the acknowledgment messages (step S14).

When the setting time of the determination timer comes (Yes at step S15), the communication failure determining unit 33 compares the total number of the acknowledgment messages with the determination threshold X (=230) for the expected number of the acknowledgment messages set by the system administrator (step S16).

In this comparison process in the communication failure determining unit 33, as shown in (FIG. 6A), if the number of the acknowledgment messages is smaller than the determination threshold (=230) for the expected number (No at step S16), for example, if the number of the acknowledgment messages is 220, the system administrator is notified of an alarm (step S17). Otherwise, the procedure goes back to step S12, and the acknowledgment request message is transmitted again after a predetermined time period.

[Acknowledgment Agent's (User Terminal's) Process II]

On the other hand, after activation, the acknowledgment agent STU acquires the acknowledgment agent identifier ID, which is stored in the memory 42 as the own area identifier, and waits for the acknowledgment request message from the monitoring server 3 (step S21).

For example, the area identifier ID may be "KANTO.KANAGAWA", and the acknowledgment agent identifier ID may be in a format such as "KANTO.KANAGAWA.KA-WASKI.1234", for example. In this embodiment, the acknowledgment agent identifier ID already includes the area identifier ID. In such a case, the acknowledgment agent identifier ID may be used alone.

With regard to the difference of this embodiment from the first embodiment, the communication confirmation message receiving unit 40 of the acknowledgment agent checks the received packet for the common monitoring group address (224.0.0.2) in the multicast network to which the own agent belongs to receive the acknowledgment request message (Yes at step S22).

The acknowledgment agent determines whether the area identifier stored in the received packet is identical to the area identifier added to itself (step S22-1).

For example, if the acknowledgment request message stores "KANTO.KANAGAWA" that is the same as the own area identifier (Yes at step S22-1), the acknowledgment agent goes to a process of step S23, and otherwise, the acknowledgment agent returns to waiting for the acknowledgment request message.

In the process of step S23, the acknowledgment probability (y in III of FIG. 5) is acquired which is stored in the received packet that is the acknowledgment request message. In the example described above, the acknowledgment probability is 5% and is set by the system administrator.

In the acknowledgment agent, the acknowledgment determining unit 41 performs a process to determine whether the acknowledgment message is returned with a probability of 5%. For example, this process can be realized by generating a random number with the use of a random number generating unit typically included as a library in a computer to generate uniformly distributed random numbers from 0 to 1, and by determining "to send an acknowledgment" if the result is in a range of 0 to 0.05 and determining "not to send an acknowledgment" if the result is not in that range.

If it is determined "to send an acknowledgment" to the acknowledgment request message (Yes at step S23), the acknowledgment message transmitting unit 43 copies the source address in the acknowledgment request message, generates an acknowledgment message storing the acknowledgment agent identifier, and returns the acknowledgment to the monitoring server 3 (step S24).

Figure 8:
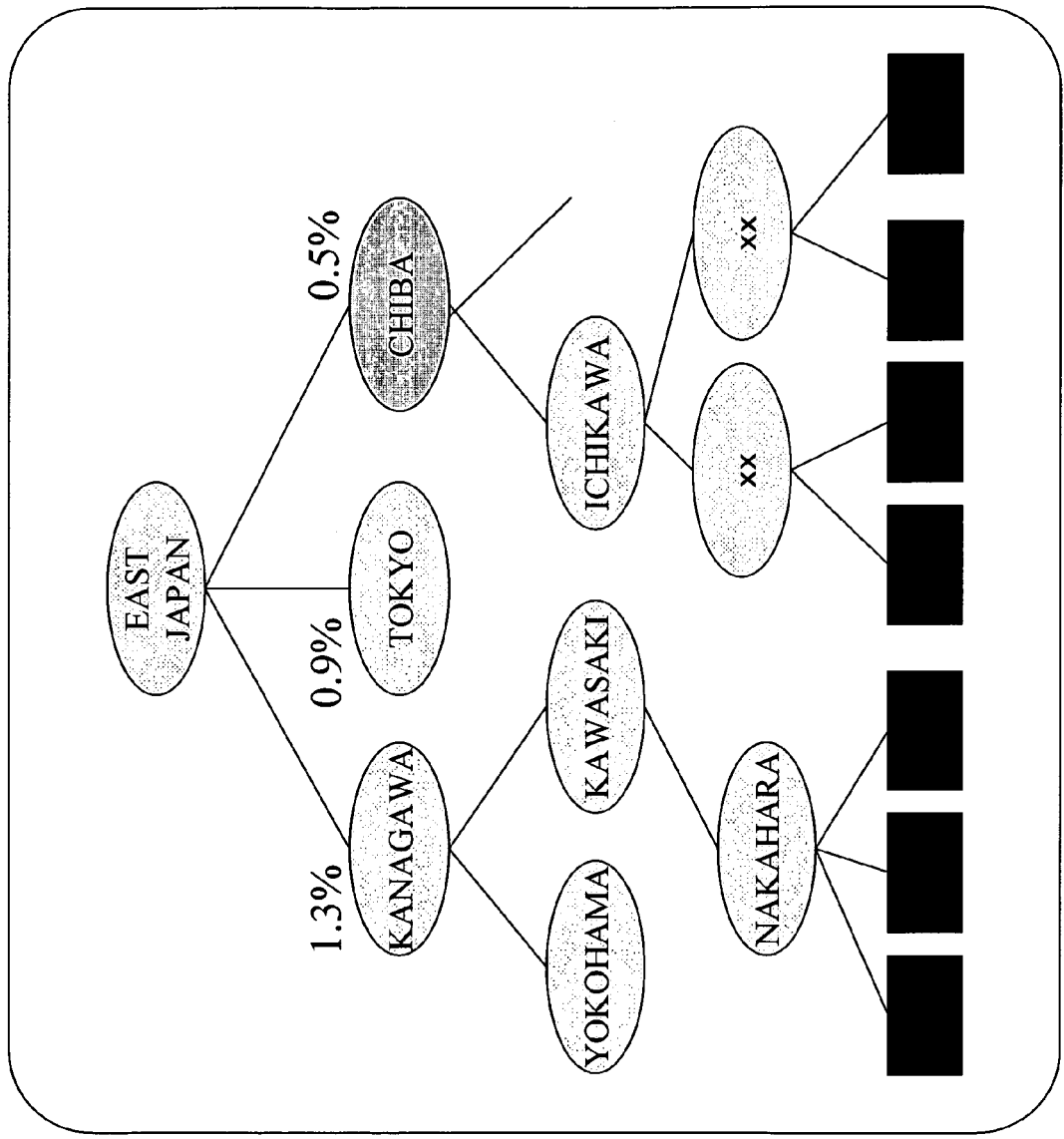
FIG. 8 is an example of grouping.

FIG. 8 is an example of grouping, and even in the case of the large-scale network, an enormous number of the acknowledgment messages can be prevented from occurring by forming area groups such as Kanagawa, Tokyo, and Chiba from a plurality of the agents connected to the multicast network 1 and by separately managing which group the agents belong to with the use of the area identifiers.

Third Embodiment

A feature of a third embodiment is intended to improve the determination accuracy by eliminating the acknowledgment messages belated for some reason.

Among the functional blocks of the monitoring server 3 and the acknowledgment agent STU shown in FIG. 3, the relationships in process procedures are the same as the preceding embodiments and, therefore, description correlated with these functional blocks is omitted in the following description of the embodiment.

The process of the third embodiment can be described with reference to the operation flow shown in FIG. 4, which is used in the description of the first embodiment.

[Monitoring Server's Process]

The process of the monitoring server 3 will be described.

An activation request is accepted from the system administrator along with arguments, which are an acknowledgment probability, an acknowledgment area identifier, the number of agents in the acknowledgment area, the number of messages used as a determination threshold, a transmission/determination interval, and a monitoring group address (step S11).

The arguments may be read from a configuration file, etc., after activation or may be input separately such that only the acknowledgment area identifier is input by the administrator and other arguments are read from a configuration file.

For example, it is assumed as follows: the acknowledgment probability is 5%; the number of agents is 5,000; the number of messages used as a determination threshold is 230; the transmission/determination interval is one second; the group address is (224.0.0.2); and the acknowledgment area identifier is "KANTO.KANAGAWA".

The monitoring server 3 generates an order identification number (e.g., 1234556789), generates an acknowledgment request message storing the acknowledgment probability of 5% and the acknowledgment area identifier "KANTO.KANAGAWA", and transmits the message to the monitoring group address (224.0.0.2) (step S12).

The order identification numbers are numbers ordered by a predetermined number, for example, one, each time the message is transmitted.

A timer is set such that the timer is activated after one second, which is the determination time specified by the system administrator (step S13).

The acknowledgment messages are received from the agents and the identification numbers are acquired from the acknowledgment messages (step S14). If the received acknowledgment message stores the order identification number earlier in the order than the order identification number stored in the acknowledgment message already received, the number of acknowledgments is not counted up for the received acknowledgment message.

As a result, belated acknowledgment messages can be eliminated to improve accuracy in subsequent determinations.

When the time of the determination timer comes (Yes at step S15), the comparison process is performed for the number of the acknowledgment messages and the determination threshold (step S16). In the comparison process, if the number of the acknowledgment messages is smaller than the threshold, for example, if the number of the acknowledgments is 220, the administrator is notified of an alarm (step S17). Otherwise, the procedure goes back to step S12, and a new acknowledgment request message is transmitted.

[Acknowledgment Agent's Process]

Description will be made of an acknowledgment agent's process.

After activation, the acknowledgment agent acquires the area identifier and the agent identifier, and waits for the acknowledgment request message from the monitoring server 3 (step S21).

For example, the area identifier may be "KANTO.KANAGAWA", and the agent identifier may be in a format such as "KANTO.KANAGAWA.KAWASKI.1234", for example. The agent identifier ID may already include the area identifier as in this example. In this case, only the agent identifier may be assigned to the acknowledgment agent. The area identifier and the agent identifier may be set by the system administrator, etc., or a mechanism may be included for an inquiry to the monitoring server 3.

If the acknowledgment request message is received (Yes at step S22), the procedure goes to a determination process (step S23).

In the determination process (step S23), the acknowledgment agent compares the area identifier stored in the acknowledgment request message and the own area identifier. For example, unless the acknowledgment request message stores "KANTO.KANAGAWA" that is the same as the own area identifier, the acknowledgment agent returns to waiting for the acknowledgment request message (step S22).

If the acknowledgment request message stores "KANTO.KANAGAWA" that is the same as the own area identifier, the acknowledgment probability is acquired from the acknowledgment request message to perform a process of returning an acknowledgment (step S24). For example, if the acknowledgment probability is 5%, the process can be realized by generating a random number with the use of a random number generating unit typically included as a library in a computer to generate uniformly distributed random numbers from 0 to 1, and by determining "to send an acknowledgment" if the result is in a range of 0 to 0.05 and determining "not to send an acknowledgment" if the result is not in that range.

If it is determined "to send an acknowledgment" as a result of the determination process at step S23 (Yes at step S23), the acknowledgment agent generates an acknowledgment message storing the agent identifier and the identification number same as that stored in the acknowledgment request message to return the acknowledgment to the monitoring server 3. The acknowledgment message is received and processed at process step S14 of the monitoring server 3.

Fourth Embodiment

A process operation of a fourth embodiment will then be described.

Description will be made only of the process of the monitoring server 3 which has a difference with the first embodiment. Therefore, an operation flow will be described with reference to the operation flow of FIG. 4.

[Monitoring Server Process]

An activation request is accepted from the system administrator along with arguments, which are an acknowledgment probability, the number of agents, a message reduction rate used as a determination threshold, a transmission/determination interval, and a monitoring group address (step S11).

The arguments may be read from a configuration file, etc., after activation. For example, it is assumed as follows: the acknowledgment probability is 5%; the number of agents is 10,000; the message reduction rate used as a determination threshold is 10% (i.e., reduction of 10% relative to the number of acknowledgment agents obtained from the acknowledgment probability of 5%); the transmission/determination interval is one second; and the group address is (224.0.0.2).

An acknowledgment request message storing the acknowledgment probability of 5% is generated and transmitted to the monitoring group address (224.0.0.2) (step S12).

A timer is set such that the timer is activated after one second, which is the determination time acquired at step S11 (step S13).

The acknowledgment messages are received from the agents and the number of the acknowledgment messages is counted up (step S14).

When the set time of the determination timer comes (Yes at step S15), the comparison process is performed for the number of the acknowledgment messages and the determination threshold (step S16). If the number of the acknowledgment messages is lower than the threshold (reduction of 10%), i.e., equal to or less than $10,000 \times 0.05 \times (1-0.1)=450$, for example, if the number of the acknowledgments is 440, the administrator is notified of an alarm (step S17).

If the condition of the alarm notification is not satisfied, the procedure goes back to step S12, and a new acknowledgment request message is transmitted.

Fifth Embodiment

Description will be made of a process operation of a fifth embodiment.

Description will be made only of the process of the monitoring server 3 which has a difference with the first embodiment as well. Therefore, an operation flow will be described with reference to the operation flow of FIG. 4.

An activation request is accepted from the system administrator along with arguments, which are an acknowledgment probability, the number of agents, a statistical significance level value used as a determination threshold, a transmission/determination interval, and a monitoring group address. The arguments may be read from a configuration file, etc., after activation. For example, it is assumed as follows: the acknowledgment probability is 5%; the number of agents is 10,000; the statistical significance level used as a determination threshold is 20%; the transmission/determination interval is one second; and the group address is (224.0.0.2).

An acknowledgment request message storing the acknowledgment probability of 5% is generated and transmitted to the monitoring group address (224.0.0.2) (step S12).

A timer is set such that the timer is activated after one second, which is the determination time acquired at step S11 (step S13).

The acknowledgment messages are received from the agents and the number of the acknowledgment messages is counted up (step S14).

When the set time of the determination timer comes (Yes at step S15), the comparison process is performed for the number of the acknowledgment messages and the determination threshold (step S16).

In the process at step S16, if the number of the acknowledgment messages is lower than the threshold (when examined with significance level of 20%), i.e., if it is determined that the number is equal to or less than $10000 \times 0.05 - 0.8416 \times \sqrt{\{10000 \times 0.05 \times (1-0.05)\}} = 481.6$, for example, if the number of the acknowledgments is 450, the administrator is notified of an alarm indicating that the number is less than the threshold (step S17).

If the alarm notification is not performed, the procedure goes back to step S12, and a new acknowledgment request message is transmitted.

Sixth Embodiment

Description will be made of a process operation of a sixth embodiment.

Description will be made only of the process of the monitoring server 3 which has a difference with the first embodiment as well. Therefore, an operation flow will be described with reference to the operation flow of FIG. 4.

An activation request is accepted from the system administrator along with arguments, which are an acknowledgment probability, groups of acknowledgment area identifier lists, the number of agents in the acknowledgment area, the number of messages used as a determination threshold, a transmission/determination interval, and a monitoring group address (step S11). The arguments may be read from a configuration file, etc., after activation or may be input separately such that only the acknowledgment area identifier is input by the administrator and other arguments are read from a configuration file.

For example, it is assumed as follows: the acknowledgment probability is 5%; the number of agents is 5,000; the number of messages used as a determination threshold is 230; the transmission/determination interval is one second; the group address is (224.0.0.2); and the groups of the acknowledgment area identifier lists are as shown in the following table.

TABLE 1

| Group 1 | Group 2 | Group 3 |
|---|---|---|
| KANTO.KANAGAWA | KANTO.TOKYO | KANTO.TOCHIGI |
| KANTO.CHIBA | | KANTO.IBARAGI |
| KANTO.SAITAMA | | |

The monitoring server 3 selects the next group (at the time of the initial selection, a group 1 is selected or one of groups 1 to 3 is selected randomly) to generate an acknowledgment request message. For example, if the group 1 is selected, the monitoring server 3 generates an acknowledgment request message storing the acknowledgment probability of 5% and the acknowledgment area identifier list of "KANTO.KANAGAWA", "KANTO.CHIBA", and "KANTO.SAITAMA" and transmits the message to the monitoring group address (224.0.0.2).

A timer is set such that the timer is activated after one second, which is the determination time acquired at step S11 (step S13).

The acknowledgment messages are received from the agents and the number of the acknowledgment messages is counted up (step S14).

When the set time of the determination timer comes (Yes at step S15), the comparison process is performed for the number of the acknowledgment messages and the determination threshold (step S16).

In the comparison process (step S16), if the number of the acknowledgment messages is lower than the threshold, for example, if the number of the acknowledgments is 220, the administrator is notified of an alarm (step S17).

If the alarm notification is not performed, the procedure goes back to step S12, and a new acknowledgment request message is transmitted.

In the sixth embodiment, if the network is large-scale, an enormous number of the acknowledgment messages can be prevented from occurring by setting groups to separately manage the target agents of each group.

Seventh Embodiment

Description will be made of a process operation of a seventh embodiment.

Description will be made only of the process of the monitoring server 3 which has a difference with the second embodiment.

Figure 9:
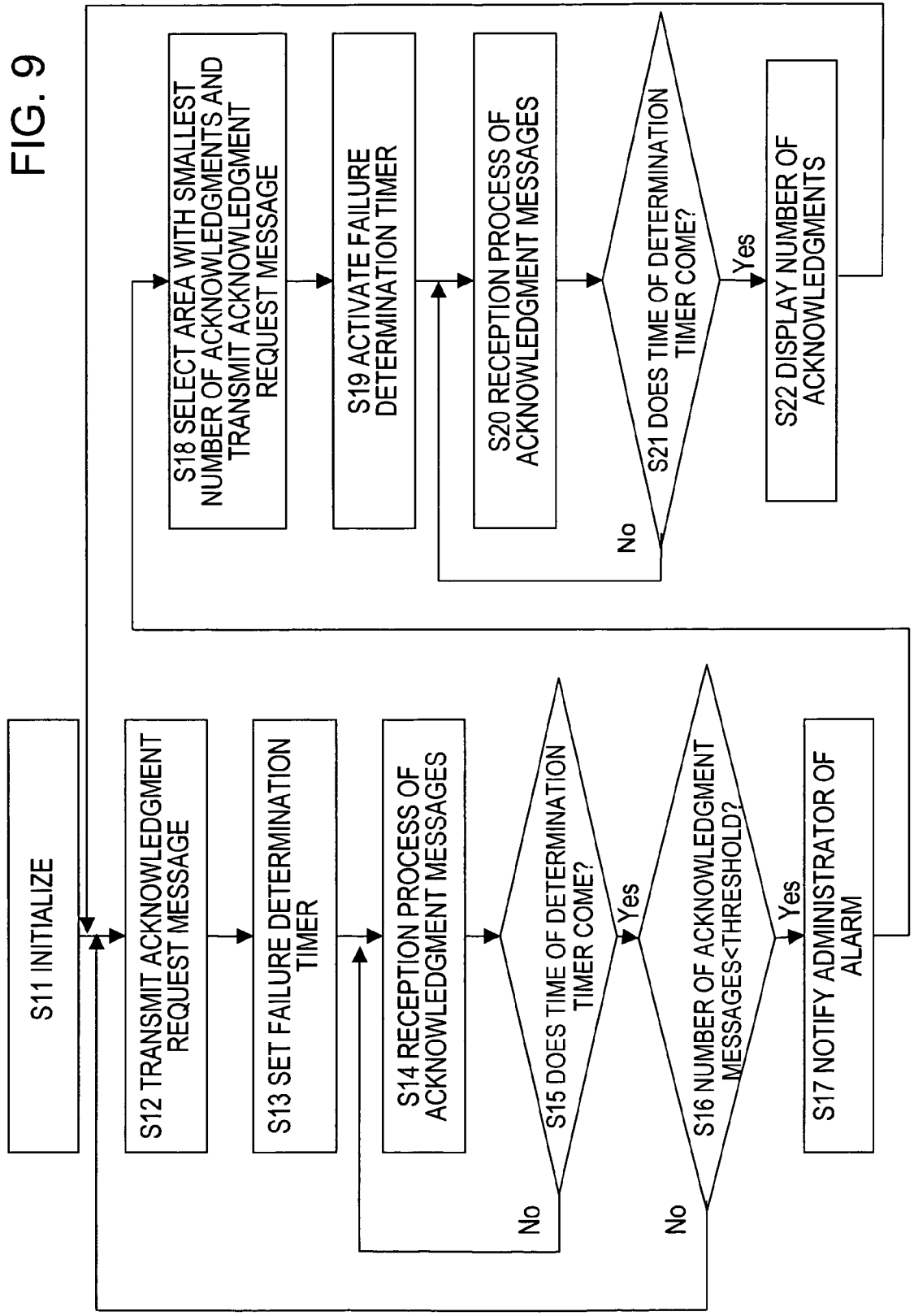
FIG. 9 is an operation flow of a monitoring server corresponding to a seventh embodiment.

FIG. 9 is an operation flow of the monitoring server 3 corresponding to the seventh embodiment. Description will be made with reference to the flow of FIG. 9.

An activation request is accepted from the system administrator along with arguments, which are an acknowledgment probability, the number of agents, the number of messages used as a determination threshold, a transmission/determination interval, and a monitoring group address (step S11).

The arguments may be read from a configuration file, etc., after activation. For example, it is assumed as follows: the acknowledgment probability is 5%; the number of agents is 10000; the number of messages used as a determination threshold is 450; the transmission/determination interval is one second; and the group address is (224.0.0.2).

The monitoring server 3 generates an acknowledgment request message storing the acknowledgment probability of 5% and transmits the message to the monitoring group address (224.0.0.2).

A timer is set such that the timer is activated after one second, which is the determination time acquired from the system administrator (step S13).

When the acknowledgment messages are received from the agents, a reception process is performed for the acknowledgment messages (step S14). In the reception process for the acknowledgment messages, the number of the acknowledgment messages is counted up for each area based on the agent identifiers stored in the acknowledgment messages. For example, if the agent identifier is "KANTO.KANAGAWA.KAWASAKI.1234", the counting is performed for the "KANTO.KANAGAWA" area, and if the agent identifier is "KANTO.TOKYO.SHINAGAWA.1000", the counting is performed for the "KANTO.TOKYO" area. This area classification (grouping of areas) is an example and is changed for each application system. Table 2 is an example of a counting result. In FIG. 8 described above, groups corresponding to table 2 (TOKYO, KANAGAWA, CHIBA) are shown, which are an example of the grouping of areas.

TABLE 2

| Area Identifier | Number of Received Acknowledgment Messages |
|---|---|
| KANTO.TOKYO | 150 |
| KANTO.KANAGAWA | 100 |

TABLE 2-continued

| Area Identifier | Number of Received Acknowledgment Messages |
|---|---|
| KANTO.CHIBA | 60 |
| Total | 440 |

When the set time of the determination timer comes (Yes at step S15), the comparison process is performed for the number of the acknowledgment messages and the determination threshold (step S16).

In the comparison process, if the number of the acknowledgment messages is lower than the threshold, for example, if the number of the acknowledgments is 440, the administrator is notified of an alarm indicating that the number is less than the threshold (step S17). Otherwise, the procedure goes back to step S12, and a new acknowledgment request message is transmitted.

When the administrator is notified of the alarm indicating that the number is less than the threshold, the area with the smallest number of the acknowledgment messages is selected (in the example shown in table 2, KANTO.CHIBA is selected, which occupies 0.5% of the number of the acknowledgment messages) to generate the acknowledgment request message storing the acknowledgment probability of 5% and the area identifier identifying KANTO.CHIBA, and the message is transmitted to the monitoring group address (224.0.0.2) (step S18).

Subsequent steps are the same as process step S13 to S16 in the second embodiment.

That is, the activation of the failure determination timer is set (step S19), and the acknowledgment messages are received from the agents to perform the reception process (step S20). In the reception process, the number of the acknowledgments is counted up.

When the time of the determination timer comes (Yes at step S21), the acknowledgment messages are displayed, and the procedure goes back to step S12. An area with the next smallest number of the acknowledgment messages is selected and the acknowledgment request message is transmitted. The subsequent processes are as described above.

In the seventh embodiment, the occurrence of a failure can be reconfirmed and the area can be further narrowed down.

Eighth Embodiment

Description will be made of a process operation of an eighth embodiment.

Description will be made only of the process of the monitoring server 3 which has a difference with the seventh embodiment. An operation flow can be described with reference to the operation flow shown in FIG. 9.

An activation request is accepted from the system administrator along with arguments, which are an acknowledgment probability, the number of agents, the number of messages used as a determination threshold, a transmission/determination interval, a monitoring group address, and the selected number of suspect areas at the time of detection of abnormality (step S11). The arguments may be read from a configuration file, etc., after activation. For example, it is assumed as follows: the acknowledgment probability is 5%; the number of agents is 10,000; the number of messages used as a determination threshold is 450; the transmission/determination interval is one second; the group address is 224.0.0.2; and the selected number of suspect areas is two.

The monitoring server 3 generates an acknowledgment request message storing the acknowledgment probability of 5% and transmits the message to the monitoring group address (224.0.0.2) (step S12).

A timer is set such that the timer is activated after one second, which is the acquired determination time (step S13).

The acknowledgment messages are received from the agents, and a reception process is performed (step S14). In the reception process, the number of the acknowledgment messages is counted up for each area based on the agent identifiers stored in the acknowledgment messages. For example, if the agent identifier is "KANTO.KANAGAWA.KAWASAKI.1234", the counting is performed for the "KANTO.KANAGAWA" area, and if the agent identifier is "KANTO.TOKYO.SHINAGAWA.1000", the counting is performed for the "KANTO.TOKYO" area. This area classification is an example and is changed for each application system. This area classification (grouping of areas) is an example and is changed for each application system. The example of the area classification is the same as that shown in table 2.

When the time of the determination timer comes (Yes at step S15), the comparison process is performed for the number of the acknowledgments and the determination threshold (step S16).

In the comparison process, if the number of the acknowledgments is lower than the threshold, for example, if the number of the acknowledgments is 440, an alarm is sent to the system administrator to indicate that the number is less than the threshold (step S17). Otherwise, the procedure goes back to step S12, and a new acknowledgment request message is transmitted.

When the administrator is notified of the alarm, the areas with the smallest numbers of the acknowledgment messages are selected to the number of suspect areas (since the selected number of suspect areas is two in this case, KANTO.CHIBA and KANTO. KANAGAWA are selected which are two areas with the smallest numbers of the acknowledgment messages) to generate the acknowledgment request message storing the acknowledgment probability of 5% and the area identifiers, and the message is transmitted to the monitoring group address (224.0.0.2) (step S18).

The subsequent processes are the same as the seventh embodiment and, therefore, will not be described.

Ninth Embodiment

Description will be made of a process operation of a ninth embodiment. Description will be made only of the process of the monitoring server 3 which has a difference with the seventh embodiment.

Figure 10:
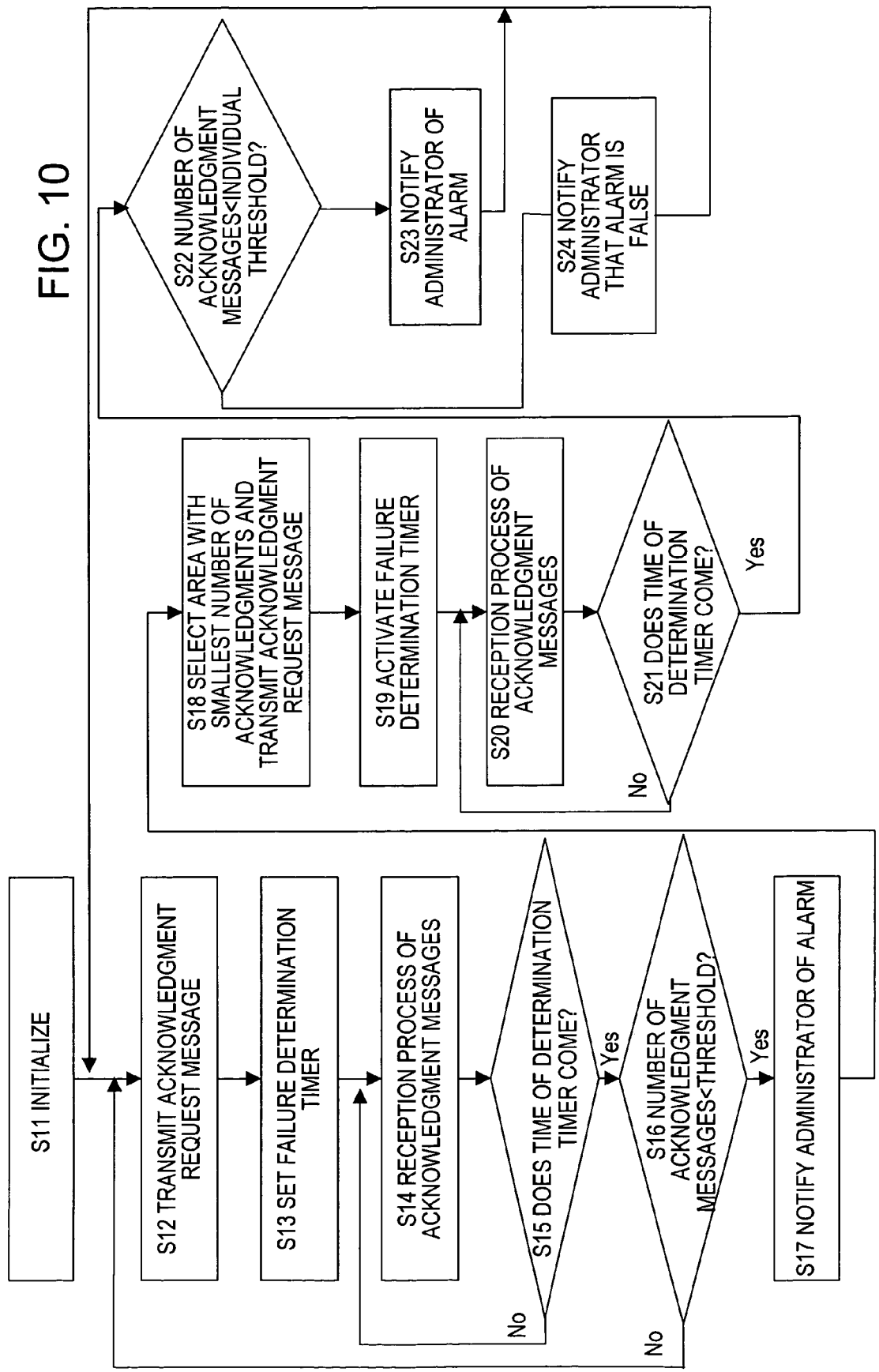
FIG. 10 is an operation flow of a ninth embodiment.

FIG. 10 is an operation flow of the ninth embodiment.

In FIG. 10, an activation request is accepted from the system administrator along with arguments, which are an acknowledgment probability, the number of agents, the number of messages in each area used as a determination threshold, a transmission/determination interval, and a monitoring group address (step S11).

The arguments may be read from a configuration file, etc., after activation. For example, it is assumed as follows: the acknowledgment probability is 5%; the number of agents is 10,000; the number of messages used as a determination threshold is 450; the transmission/determination interval is one second; the group address is (224.0.0.2); and the number of messages used as a determination threshold in each area is as shown in table 3.

The monitoring server 3 generates an acknowledgment request message storing the acknowledgment probability of 5% and transmits the message to the monitoring group address (224.0.0.2) (step S12).

A timer is set such that the timer is activated after one second, which is the acquired determination time (step S13).

The acknowledgment messages are received from the agents, and a reception process is performed (step S14). In the reception process, the number of the acknowledgment messages is counted up for each area based on the agent identifiers stored in the acknowledgment messages. For example, if the agent identifier is "KANTO.KANAGAWA.KAWASAKI.1234", the counting is performed for the "KANTO.KANAGAWA" area, and if the agent identifier is "KANTO.TOKYO.SHINAGAWA.1000", the counting is performed for the "KANTO.TOKYO" area. The result is shown in table 3. This area classification is an example and may be changed for each system.

TABLE 3

| Area ID | Number of Acknowledgment Messages | Comparative Number |
|---|---|---|
| KANTO.TOKYO | 150 | 145 |
| KANTO.KANAGAWA | 100 | 110 |
| KANTO.CHIBA | 60 | 110 |
| Total | 440 | 450 |

When the set time of the determination timer comes (Yes at step S15), the comparison process is performed for the number of the acknowledgments and the determination threshold (step S16).

In the comparison process, if the number of the acknowledgment messages is lower than the threshold, for example, if the number of the acknowledgments is 440, an alarm is sent to the administrator to indicate that the number is less than the threshold (step S17).

The area with the smallest number of the acknowledgment messages is selected (in the example shown in table 3, KANTO.CHIBA is selected) to generate the acknowledgment request message storing the acknowledgment probability of 5% and the area identifier, and the message is transmitted to the monitoring group address (224.0.0.2) (step S18).

A timer is set such that the timer is activated after one second, which is the acquired determination time (step S19).

The acknowledgment messages are received from the agents, and the reception process is performed (step S20). In the reception process, the number of the acknowledgment messages is counted up.

When the set time of the determination timer comes (Yes at step S21), the comparison process is performed for the number of the acknowledgments and the determination threshold (step S22).

In the comparison process, the total number of the acknowledgment messages is compared with the comparative number for the area selected at step S17. In this case, the total number is compared with the comparative number of 110 for KANTO.CHIBA. If the number of the acknowledgment messages is lower than 110, an alarm is sent to the administrator to indicate that the number is less than the threshold (step S23). Otherwise, an alarm is sent to indicate that the alarm is false, and the procedure goes back to step S12 (step S24).

In the ninth embodiment, a more accurate determination can be made.

Tenth Embodiment

Description will be made of a process operation of a tenth embodiment. Description will be made of the process of the monitoring server 3 which has a difference based on the ninth embodiment. An operation flow can be described with reference to FIG. 10 describing the ninth embodiment.

An activation request is accepted from the system administrator along with arguments, which are an acknowledgment probability, the number of agents, the number of messages in each area used as a determination threshold, a transmission/determination interval, a monitoring group address, and an acknowledgment probability when processing a suspect area. The arguments may be read from a configuration file, etc., after activation. For example, it is assumed as follows: the acknowledgment probability is 5%; the number of agents is 10,000; the number of messages used as a determination threshold is 450; the transmission/determination interval is one second; the group address is (224.0.0.2); the acknowledgment probability when processing a suspect area is 10%; and the number of messages in each area is as shown in table 4 below.

The monitoring server 3 generates an acknowledgment request message storing the acknowledgment probability of 5% and transmits the message to the monitoring group address (224.0.0.2) (step S12).

A timer is set such that the timer is activated after one second, which is the acquired determination time (step S13).

The acknowledgment messages are received from the agents, and a reception process is performed (step S14). In the reception process, the number of the acknowledgments is counted up for each area based on the agent identifiers stored in the acknowledgment messages. For example, if the agent identifier is "KANTO.KANAGAWA.KAWASAKI.1234", the counting is performed for the "KANTO.KANAGAWA" area, and if the agent identifier is "KANTO.TOKYO.SHINAGAWA.1000", the counting is performed for the "KANTO.TOKYO" area. Table 4 shows an example of the result of the counting up. This area classification is an example and may be changed for each system.

TABLE 4

| Area ID | Number of Acknowledgment Messages | Comparative Number |
|---|---|---|
| KANTO.TOKYO | 150 | 290 |
| KANTO.KANAGAWA | 100 | 220 |
| KANTO.CHIBA | 60 | 220 |
| Total | 440 | 450 |

When the time of the determination timer comes (step S15), the comparison process is performed for the number of the acknowledgments and the determination threshold (step S16).

In the comparison process, if the number of the acknowledgment messages is lower than the threshold, for example, if the number of the acknowledgment messages is 440, an alarm is sent to the administrator to indicate that the number is less than the threshold (step S17).

The area with the smallest number of the acknowledgment messages is selected (in the example shown in table 4, KANTO.CHIBA is selected). The acknowledgment request message is generated, which stores the acknowledgment probability at the time of processing the suspect area, i.e., 10%, and the area identifier, and the message is transmitted to the monitoring group address (224.0.0.2) (step S18).

A timer is set such that the timer is activated after one second, which is the acquired determination time (step S19).

The acknowledgment messages are received from the agents, and the reception process is performed (step S20). In the reception process, the number of the acknowledgment messages is counted up.

When the set time of the determination timer comes (Yes at step S21), the comparison process is performed for the number of the acknowledgment messages and the determination threshold (step S22).

In the comparison process, the total number of the acknowledgment messages is compared with the comparative number for the area selected at step S18. In the example shown in table 4, the total number is compared with the comparative number of 220 for KANTO.CHIBA. If the number of the acknowledgment messages is lower than 220, an alarm is sent to the administrator to indicate that the number is less than the threshold, and the procedure goes back to step S12 (step S23). Otherwise, an alarm is sent to indicate that the alarm is false, and the procedure goes back to step S12 (step S24).

Eleventh Embodiment

Description will be made of a process operation of an eleventh embodiment. Description will be made of the process of the monitoring server 3 which has a difference based on the fifth and seventh embodiments. An operation flow can be described with reference to FIG. 10 describing the ninth embodiment.

An activation request is accepted from the system administrator along with arguments, which are an acknowledgment probability, the number of agents in each area, a statistical significance level value used as a determination threshold, a transmission/determination interval, a monitoring group address, and a statistical significance level value when narrowing down a suspect area (step S11).

The arguments may be read from a configuration file, etc., after activation. For example, it is assumed as follows: the acknowledgment probability is 5%; the number of agents is 10,000; the statistical significance level used as a determination threshold is 20%; the transmission/determination interval is one second; the group address is (224.0.0.2); the statistical significance level value when narrowing down a suspect area is 10%; and the number of messages in each area is as shown in table 5 below.

The monitoring server 3 generates an acknowledgment request message storing the acknowledgment probability of 5% and transmits the message to the monitoring group address (224.0.0.2) (step S12).

A timer is set such that the timer is activated after one second, which is the acquired determination time (step S13).

The acknowledgment messages are received from the agents, and a reception process is performed (step S14). In the reception process, the number of the acknowledgments is counted up for each area based on the agent identifiers stored in the acknowledgment messages. For example, if the agent identifier is "KANTO.KANAGAWA.KAWASAKI.1234", the counting is performed for the "KANTO.KANAGAWA" area, and if the agent identifier is "KANTO.TOKYO.SHINAGAWA.1000", the counting is performed for the "KANTO.TOKYO" area. This area classification is an example and is changed for each application system. Table 5 shows an example of the result of the counting up.

TABLE 5

| Area ID | Number of Acknowledgment Messages | Number of Agents |
|---|---|---|
| KANTO.TOKYO | 150 | 3010 |
| KANTO.KANAGAWA | 100 | 1980 |
| KANTO.CHIBA | 60 | 2000 |
| Total | 440 | 10000 |

When the time of the determination timer comes (Yes at step S15), the comparison process is performed for the number of the acknowledgment messages and the determination threshold (step S16).

In the comparison process, if the number of the acknowledgment messages is lower than the threshold (when examined with significance level of 20%), i.e., if it is determined that the number is equal to or less than $10000 \times 0.05 - 0.8416 \times \sqrt{\{10000 \times 0.05 \times (1-0.05)\}} = 481.6$, for example, if the number of the acknowledgments is 450, an alarm is sent to the administrator to indicate that the number is less than the threshold (step S17). Otherwise, the procedure goes back to step S12, and a new acknowledgment request message is transmitted.

The area with the smallest number of the acknowledgment messages is selected (in this example, KANTO.CHIBA is selected) to generate the acknowledgment request message storing the acknowledgment probability of 5% and the area identifier, and the message is transmitted to the monitoring group address (224.0.0.2) (step S18).

A timer is set such that the timer is activated after one second, which is the acquired determination time (step S19).

The acknowledgment messages are received from the agents, and the reception process is performed (step S20). In the reception process, the number of the acknowledgment messages is counted up.

When the time of the determination timer comes (Yes at step S21), the comparison process is performed for the number of the acknowledgment messages and the determination threshold (step S22).

In the comparison process, if the number of the acknowledgments is lower than the threshold (when examined with significance level of 10%), i.e., if it is determined that the number is equal to or less than $2000 \times 0.05 - 1.282 \times \sqrt{\{20000 \times 0.05 \times (1-0.05)\}} = 87.5$, for example, if the number of the acknowledgments is 70, an alarm is sent to the administrator to indicate that the number is less than the threshold (step S23). Otherwise, an alarm is sent to indicate that the alarm is false, and the procedure goes back to step S12 (step S24).

In the eleventh embodiment, a highly accurate determination can be made.

Twelfth Embodiment

Description will be made of a process operation of a twelfth embodiment. In this embodiment, the process of the eleventh embodiment is changed after step S18 of the operation flow.

That is, at step S18 in FIG. 10, the area with the smallest number of the acknowledgments is selected (in the example shown in table 5, KANTO.CHIBA is selected) to generate the acknowledgment request message storing the acknowledgment probability of 10% and the area identifier, and the message is transmitted to the monitoring group address (224.0.0.2).

A timer is set such that the timer is activated after one second, which is the acquired determination time (step S19).

The acknowledgment messages are received from the agents, and the number of the acknowledgment messages is counted up (step S20).

When the time of the determination timer comes (Yes at step S21), the comparison process is performed for the number of the acknowledgment messages and the determination threshold (step S22).

In the comparison process, if the number of the acknowledgment messages is lower than the threshold (when examined with significance level of 10%), i.e., if it is determined that the number is equal to or less than $2000 \times 0.1 - 1.282 \times \sqrt{\{2000 \times 0.1 \times (1-0.1)\}} = 182.8$, for example, if the number of the acknowledgments is 140, an alarm is sent to the administrator to indicate that the number is less than the threshold (step S23).

Otherwise, an alarm is sent to indicate that the alarm is false, and the procedure goes back to step S12 (step S24).

Thirteenth Embodiment

Figure 11:
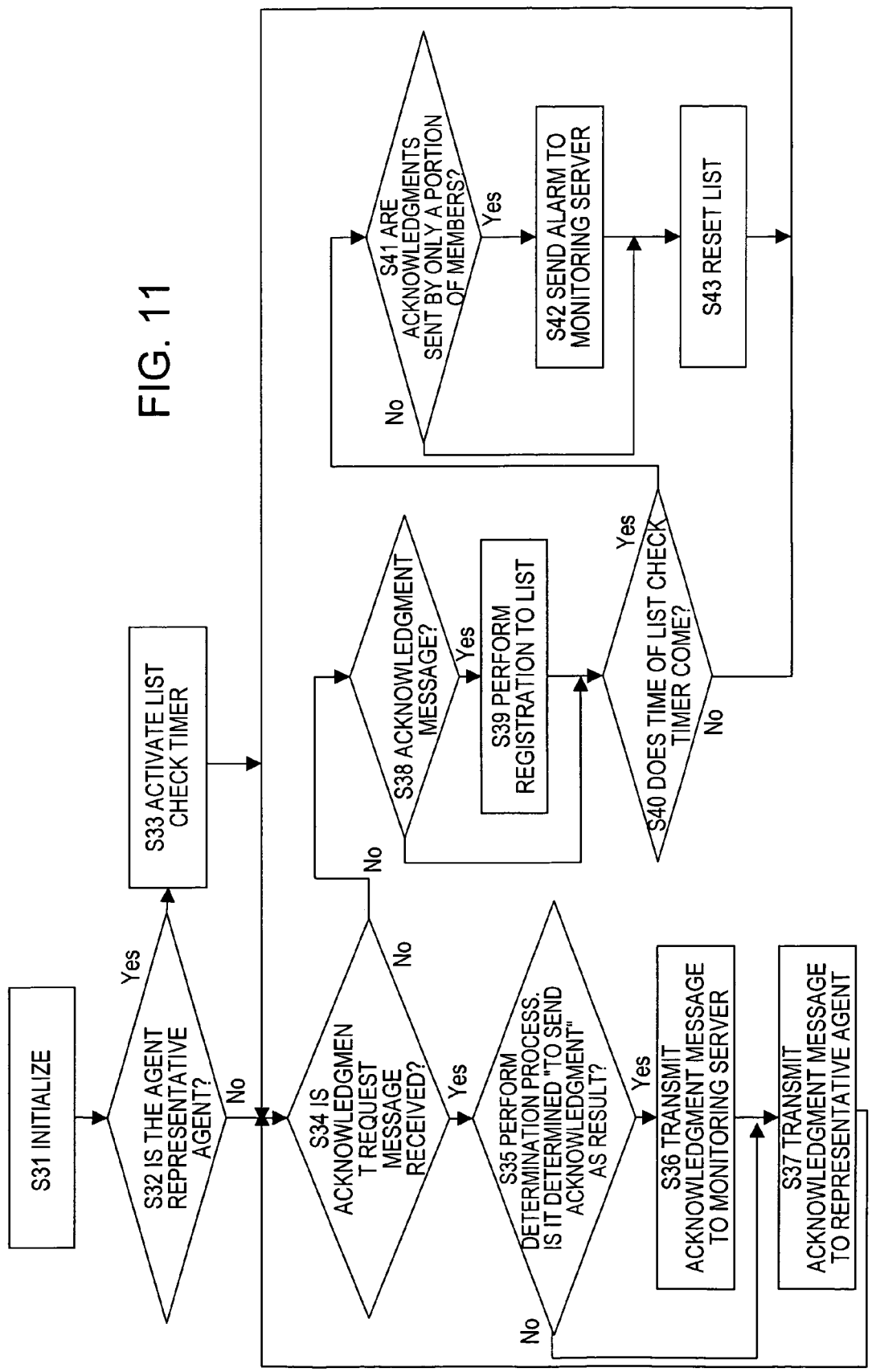
FIG. 11 is a corresponding operation flow of an acknowledgment agent in a thirteenth embodiment.

Description will be made of an embodiment of the process of the acknowledgment agent. FIG. 11 is a corresponding operation flow of the acknowledgment agent. In this embodiment, a representative agent comprehends a situation of the acknowledgment from a specified agent and notifies a management server of the situation in the first or second embodiment.

In FIG. 11, at the time of activation or after activation, the acknowledgment agent acquires an agent identifier, the address of the representative agent, representative agent flag, an agent identifier list of group members, a list monitoring interval, and the address of the monitoring server (step S31), and waits for the acknowledgment request message from the monitoring server.

The acknowledgment agent identifier ID may be in a format such as "KANTO.KANAGAWA.KAWASKI.1234", for example, and the address of the representative agent may be in the IP address format.

The representative agent flag indicates whether the agent is the representative agent and indicates that the agent is the representative agent if the flag is true and is not if the flag is false, for example. The agent identifier list of the group members, the list monitoring interval, and the address (including a port number) of the monitoring server are valid when the representative agent flag is true.

The above setting information may be set by the system administrator, etc., or a mechanism may be included for an inquiry to the monitoring server.

When the representative agent flag indicates that the agent is the representative agent, a timer is set such that the timer is activated after the acquired list monitoring interval, for example, one second (step S33).

If the agent is not the representative agent, the agent is put into a state of receiving the acknowledgment request message (step S34).

When a message is received and the message is the acknowledgment request message (Yes at step S34), a determination process is performed (step S35). If the message is not the acknowledgment request message, it is determined whether the message is an acknowledgment message (step S38).

In the determination process (step S35), the acknowledgment probability stored in the acknowledgment request message is acquired. For example, in the case of 5%, the acknowledgment agent performs a process of returning acknowledgments with a probability of 5% (step S36).

For example, in this process, a random number is generated with the use of a random number generating unit typically included as a library in a computer to generate uniformly distributed random numbers from 0 to 1, and it is determined that "an acknowledgment is sent" if the result is in a range of 0 to 0.05 (step S36) and it is determined that "an acknowledgment is not sent" if the result is not in that range. Whether "an acknowledgment is sent" or "an acknowledgment is not sent", the acknowledgment agent notifies the representative agent of the acknowledgment message and the procedure goes back to step S34 (step S37).

If it is determined that "an acknowledgment is sent" at step S35, an acknowledgment message storing the agent identifier is generated at step S36 to return the acknowledgment to the monitoring server 3. The acknowledgment message is received and processed by the monitoring server 3 as described in the precedent embodiments.

On the other hand, if the acknowledgment message is received in the reception process (Yes at step S38), the presence of the acknowledgment is registered (marked) in the member list based on the agent identifier stored in the acknowledgment message (step S39). For example, a table like table 6 is prepare, and if an acknowledgment is sent from "KANTO.KANAGAWA.KAWASAKI.1235", true is set.

TABLE 6

| Agent ID | Acknowledgment Flag |
|---|---|
| KANTO.KANAGAWA.KAWASAKI.1234 | false |
| KANTO.KANAGAWA.KAWASAKI.1235 | true |
| KANTO.KANAGAWA.KAWASAKI.1236 | false |

When the time of the list check timer set at step S33 comes (Yes at step S40), it is checked whether the acknowledgment members are a portion of the list of table 6.

For example, if all the acknowledgment flags in the list of table 6 are false or true, the list is reset (e.g., all the acknowledgment flags are set to false) and the procedure goes back to step S34.

Contrary, if false and true flags are mixed, the monitoring server 3 is notified of the presence of agents not returning the acknowledgment (step S42) and the list is reset (step S43).

By applying such a process of the acknowledgment agent to the first and second embodiment, a communication failure can be detected for a few acknowledgment agents that cannot be detected while preventing the implosion of the acknowledgment messages.

While the illustrative and presently preferred embodiments of the present invention have been described in detail herein, it is to be understood that the inventive concepts may be otherwise variously embodied and employed and that the appended claims are intended to be construed to include such variations except insofar as limited by the prior art.

What is claimed is:

1. A multicast network system, in which each packet sent out from a source device is copied and transmitted to a plurality of user terminals, the multicast network system comprising:

a multicast network including a plurality of relay nodes hierarchically provided, each of which copies an input packet and outputs the copied packet to a next relay node;

a monitoring server coupled to a relay node located at a highest end of the hierarchy; and a plurality of user terminals, which are respectively coupled to corresponding relay nodes, each of which is located at lowest ends of the hierarchy, wherein the monitoring server comprises:

an acknowledgment request message generating unit to generate an acknowledgment request message which includes an acknowledgment probability and to send the generated acknowledgment request message to the plurality of user terminals through the multicast network;

a collecting unit to collect acknowledgment messages, which are sent from the user terminals to respond to the acknowledgement request message; and a collection number comparing unit to compare the number of the acknowledgment messages collected by the collecting unit with an expected number of acknowledgment messages calculated from the acknowledgment probability and the total number of the user terminals, each of the plurality of user terminals comprises:

a random number generating unit to generate a random number; and an acknowledgment message sending unit to determine whether an acknowledgment is needed for responding to the acknowledgment request message based on a comparison of the acknowledgment probability included in the acknowledgment request message with the random number generated by the random number generating unit, and to send an acknowledgment message when the acknowledgment is determined as needed, and wherein the collection number comparing unit of the monitoring server determines whether a failure occurs in the multicast network based on a comparison result of the expected number of the acknowledgment messages and the number of the acknowledgment messages actually collected by the collecting unit.

2. The multicast network system according to claim 1, wherein the acknowledgment request message generating unit further includes into the acknowledgment request message an acknowledgment area identifier that identifies an acknowledgment requested area, and wherein each of the plurality of user terminals compares the acknowledgment requested area identifier identified by the acknowledgment area identifier included in the acknowledgment request message with an area to which a user terminal receiving the acknowledgment request message belongs and, if both the areas are identical, the acknowledgment message sending unit performs the determination of whether an acknowledgment is needed for the acknowledgment request message.

3. The multicast network system according to claim 1, wherein the acknowledgment request message generating unit further includes an order identification number into the acknowledgment request message, wherein when generating and sending an acknowledgment message, each of the plurality of user terminals copies the order identification number included in the acknowledgment request message and includes the copied order identification number into the acknowledgment message, which is transmitted, and wherein If a received acknowledgment message includes the order identification number earlier in the order than the order identification number included in acknowledgment messages already received, the received acknowledgment message is not subject to be compared by the collection number comparing unit of the monitoring server.

4. The multicast network system according to claim 2, wherein the acknowledgment request message generating unit further includes an order identification number into the acknowledgment request message, wherein when generating and sending an acknowledgment message, each of the plurality of user terminals copies the order identification number included in the acknowledgment request message and includes the copied order identification number into the acknowledgment message, which is transmitted, and wherein if a received acknowledgment message includes the order identification number earlier in the order than the order identification number included in acknowledgment messages already received, the received acknowledgment message is not subject to be compared by the collection number comparing unit of the monitoring server.

5. The multicast network system according to claim 2, wherein the monitoring server further comprises a group acknowledgment area identifier retaining unit that groups the acknowledgement area identifiers into a plurality of groups, each of which is identified by a group identifier, and stores a plurality of group identifiers, and wherein the acknowledgment request message generating unit includes into acknowledgment request belonging to the messages belonging to a group, a group identifier identifying the group, read from the group acknowledgment area identifier retaining unit, and sends the acknowledgment request messages for the group.

6. The multicast network system according to claim 5, wherein the collection number comparing unit of the monitoring server collects the acknowledgment messages from the user terminals for each group acknowledgment area identifier and specifies an acknowledgment area with the smallest number of the acknowledgment messages to perform a failure determination process if the number of the acknowledgment messages actually collected is smaller by a predetermined value or more than the expected number of the acknowledgment messages calculated from the acknowledgment probability and the number of the user terminals belonging to the group acknowledgment area.

7. The multicast network system according to claim 1, wherein a comparison item of the collection number comparing unit is specified by a predefined reduction rate relative to the expected number of acknowledgments.

8. The multicast network system according to claim 1, wherein a comparison item of the collection number comparing unit is specified by a predefined statistical significance level.

9. The multicast network system according to claim 5, wherein the monitoring server comprises a unit that stores the selected number of suspect areas and, if the number of the acknowledgment messages actually collected is smaller by a predetermined value or more than the expected number of the acknowledgment messages calculated from the acknowledgment probability and the number of the acknowledgment agents, the monitoring server selects areas with the smallest numbers of the acknowledgment messages to the selected number of suspect areas registered in advance, and designates the selected areas as the acknowledgment areas to perform the failure determination process.

10. The multicast network system according to claim 9, wherein
the selected number of suspected areas registered in advance is the number of messages at the time of a narrowing down process defined in advance.

11. The multicast network system according to claim 5, wherein
the monitoring server comprises a unit that defines an acknowledgment probability in the case of narrowing down the area to perform a monitoring process.

12. The multicast network system according to claim 9, wherein
the monitoring server comprises a unit that defines an acknowledgment probability in the case of narrowing down the area to perform a monitoring process.

13. The multicast network system according to claim 10, wherein
the monitoring server comprises a unit that defines an acknowledgment probability in the case of narrowing down the area to perform a monitoring process.

14. The multicast network system according to claim 5, wherein
the monitoring server comprises a unit that stores a statistical significance level for comparison in the case of narrowing down the area to perform a monitoring process and the comparison item of the collection number comparing unit is a statistical significance level at the time of a narrowing down process defined in advance by an administrator.

15. The multicast network system according to claim 9, wherein
the monitoring server comprises a unit that stores a statistical significance level for comparison in the case of narrowing down the area to perform a monitoring process and the comparison item of the collection number comparing unit is a statistical significance level at the time of a narrowing down process defined in advance by an administrator.

16. The multicast network system according to claim 10, wherein
the monitoring server comprises a unit that stores a statistical significance level for comparison in the case of narrowing down the area to perform a monitoring process and the comparison item of the collection number comparing unit is a statistical significance level at the time of a narrowing down process defined in advance by an administrator.

17. The multicast network system according to claim 5, comprising:
a unit that defines an acknowledgment probability in the case of narrowing down the area to perform a monitoring process and a unit that stores a statistical significance level for comparison in the case of narrowing down the area to perform a monitoring process.

18. The multicast network system according to claim 9, comprising:
a unit that defines an acknowledgment probability in the case of narrowing down the area to perform a monitoring process and a unit that stores a statistical significance level for comparison in the case of narrowing down the area to perform a monitoring process.

19. The multicast network system according to claim 10, comprising:
a unit that defines an acknowledgment probability in the case of narrowing down the area to perform a monitoring process and a unit that stores a statistical significance level for comparison in the case of narrowing down the area to perform a monitoring process.

20. The multicast network system according to claim 1, wherein:
a representative user terminal is specified, which is one of the plurality of user terminals, the representative user terminal including a list of the plurality of user terminals,
when the acknowledgment request message is received, the representative user terminal transmits an acknowledgment message in accordance with the acknowledgment probability included in the acknowledgment request message,
each of user terminals other than the representative user terminal transmits an acknowledgment message to the representative user terminal every time the acknowledgment request message is received,
when the acknowledgment message is received from each of the user terminals other than the representative user terminal, the representative user terminal registers the reception in the list of the plurality of user terminals, and wherein
the representative user terminal sends an alarm at predetermined intervals if the acknowledgment messages are received from only a portion of the plurality of user terminals listed in the list.

21. The multicast network system according to claim 2, wherein:
a representative user terminal is specified, which is one of the plurality of user terminals, the representative user terminal including a list of the plurality of user terminals,
when the acknowledgment request message is received, the representative user terminal transmits an acknowledgment message in accordance with the acknowledgment probability included in the acknowledgment request message,
each of user terminals other than the representative user terminal transmits an acknowledgment message to the representative user terminal every time the acknowledgment request message is received,
when the acknowledgment message is received from each of the user terminals other than the representative user terminal, the representative user terminal registers the reception in the list of the plurality of user terminals, and wherein
the representative user terminal sends an alarm at predetermined intervals if the acknowledgment messages are received from only a portion of the plurality of user terminals listed in the list.

* * * * *